April 25, 1967 H. C. CONGELLI ETAL 3,315,961

RESPOTTING MECHANISM

Original Filed May 18, 1962

11 Sheets-Sheet 1

INVENTORS
HENRY C. CONGELLI
GORDON W. HAYS

BY [signature]
ATTORNEY

INVENTORS
HENRY C. CONGELLI
GORDON W. HAYS
BY
Wentworth L. B. Clapham
ATTORNEY

INVENTORS
HENRY C. CONGELLI
GORDON W. HAYS
BY
Wentworth B. Clapham
ATTORNEY

INVENTORS
HENRY C. CONGELLI
GORDON W. HAYS
BY
Wentworth B. Clapham
ATTORNEY

RESPOTTING MECHANISM

Original Filed May 18, 1962

11 Sheets-Sheet 5

INVENTORS
HENRY C. CONGELLI
GORDON W. HAYS
BY Wentworth L. B. Clapham
ATTORNEY

INVENTORS
HENRY C. CONGELLI
GORDON W. HAYS
BY
Wentworth B. Clapham
ATTORNEY

April 25, 1967 H. C. CONGELLI ET AL 3,315,961
RESPOTTING MECHANISM
Original Filed May 18, 1962 11 Sheets-Sheet 7
FIG. 10
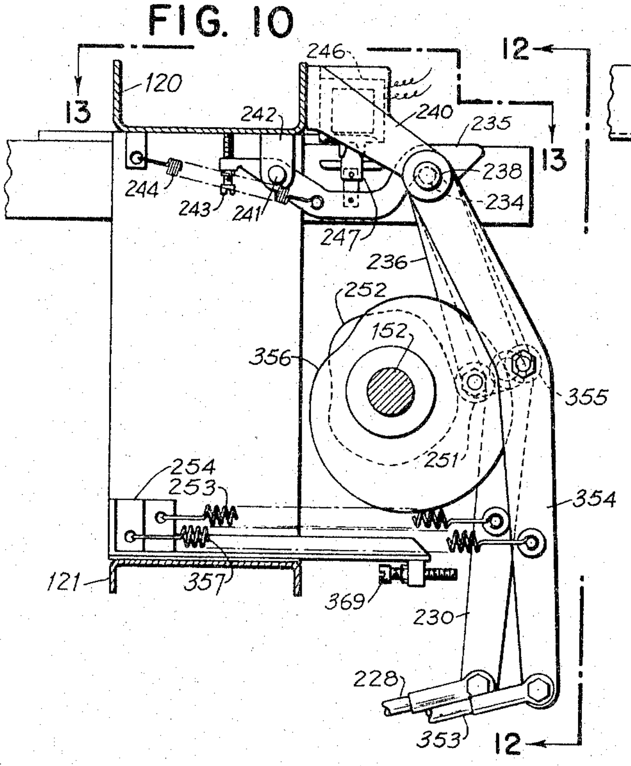
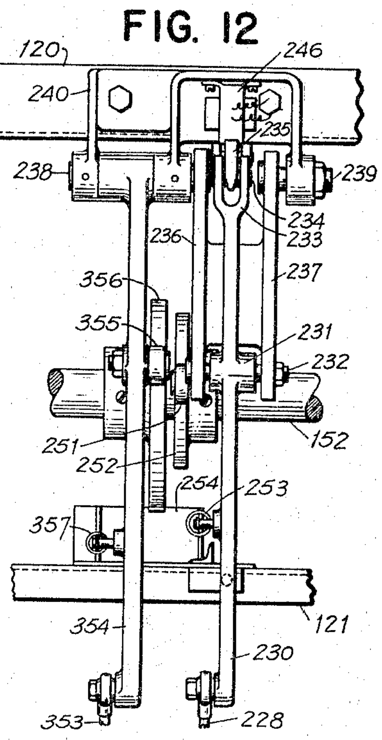
FIG. 11
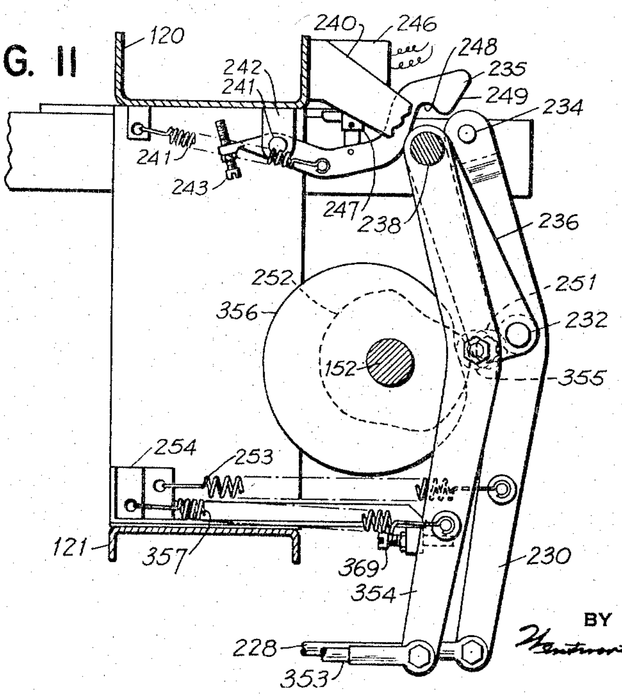
INVENTORS
HENRY C. CONGELLI
GORDON W. HAYS
BY Wentworth B. Clapham
ATTORNEY April 25, 1967 H. C. CONGELLI ET AL 3,315,961

RESPOTTING MECHANISM

Original Filed May 18, 1962

11 Sheets-Sheet 8

INVENTORS
HENRY C. CONGELLI
GORDON W. HAYS

BY [signature]

ATTORNEY

April 25, 1967 H. C. CONGELLI ET AL 3,315,961

RESPOTTING MECHANISM

Original Filed May 18, 1962 11 Sheets-Sheet 9

INVENTORS
HENRY C. CONGELLI
GORDON W. HAYS
BY
Wentworth B. Clapham
ATTORNEY

INVENTORS
HENRY C. CONGELLI
GORDON W. HAYS
BY
Wentworth B. Clapham
ATTORNEY

April 25, 1967 H. C. CONGELLI ETAL 3,315,961

RESPOTTING MECHANISM

Original Filed May 18, 1962 11 Sheets-Sheet 11

INVENTORS
HENRY C. CONGELLI
GORDON W. HAYS

BY Wentworth B. Clapham

ATTORNEY 3,315,961

RESPOTTING MECHANISM

Henry C. Congelli, Stamford, and Gordon W. Hays, Springdale, Conn., assignors to American Machine & Foundry Company, a corporation of New Jersey Original application May 18, 1962, Ser. No. 195,926, now Patent No. 3,245,684, dated Apr. 12, 1966. Divided and this application June 28, 1965, Ser. No. 467,261
16 Claims. (Cl. 273—43)

This invention relates to bowling pin spotting machines, and more particularly to improvements to mechanism for spotting and respotting pins in playing formation on the pin deck of a bowling alley. This application is a division of copending application Ser. No. 195,926, filed May 18, 1962 and now Patent No. 3,245,684.

In accordance with one feature of the invention, the mechanism is constructed to provide a large effective respotting area; i.e., that area within which a standing pin can be picked up. Such construction is advantageous since it increases the off-spot coverage, and hence the utility of the respotting mechanism. It reduces greatly the frequency of out of range pins, and, therefore, the possibility that an off-spot pin will damage the spotting or respotting mechanism or prevent the proper operation of the machine. Present commercial embodiments of respotting mechanisms include a plurality of respotting units each having an effective respotting area in the order of twenty-four (24) square inches. In contrast, the present invention provides a markedly increased effective respotting area of fifty-five (55) or more square inches.

Thus, one of the objects of the invention is to provide an improved pin spotting machine having novel pin spotting and respotting mechanism wherein the latter has a markedly increased effective respotting area, the mechanism being capable of picking up both on and off spot pins and respotting such pins in the positions which they occupied prior to being picked up.

In the past, many attempts have been made to provide a large respotting area, but such attempts usually resulted in increasing the height of the space occupied by the spotting machine. Thus, another object is to provide a spotting-respotting mechanism which provides an effective respotting area heretofore not available in the art and at the same time make possible the construction of a machine which is vertically compact.

In accordance with another feature of the invention, the respotting mechanism is operative to respot standing pins without employing clamping members that clamp standing pins against the alley. This is accomplished by providing a plurality of respotting units which comprise a plurality of sets of opposed gripper bars. The gripping bars are mounted for movement with as little frictional engagement as possible so that they can be moved into and out of engagement with the head of a pin without knocking the pin over.

In accordance with another feature of the invention, the respotting mechanism includes a plurality of respotting units each provided with a set of gripper bars. During the respotting cycle, each set of gripper bars is moved into a closed position adjacent to the neck of a pin so that a small clearance exists between one or both of the bars and the pin. Then, instead of moving the bars laterally into gripping engagement, the bars are locked in such closed position and are raised to take up the clearance as they engage and left the pin.

The invention further consists in the provision of a novel drive mechanism that operates the spotting-re-spotting mechanism in timed relationship to the cyclic movement of a spotting-respotting table for spotting and re-spotting bowling pins on an alley. The drive mechanism includes actuating means for the respotting units which is inoperative during the spotting cycle and a drive mechanism for the spotting units that is rendered inoperative during the respotting cycle.

Other objects include the provision of an improved spotting-respotting mechanism which is relatively simple in construction; operates rapidly and economically; and is relatively free of maintenance problems.

The foregoing is intended to point out only some of the more general features of the invention and is not to be taken in any limiting sense since there are several features not mentioned above which are advantageous and are described and claimed.

In order that the manner in which these and other objects are attained in accordance with the invention can be understood in detail, reference is had to the accompanying drawings, which form a part of this specification, and wherein:

FIGURES 10 and 11 are side elevational views, partly in section, of another portion of the spotting and respotting table operating mechanism;

FIGURE 12 is a front elevational view taken along line 12—12 in FIGURE 10;

Figures 15, 16:
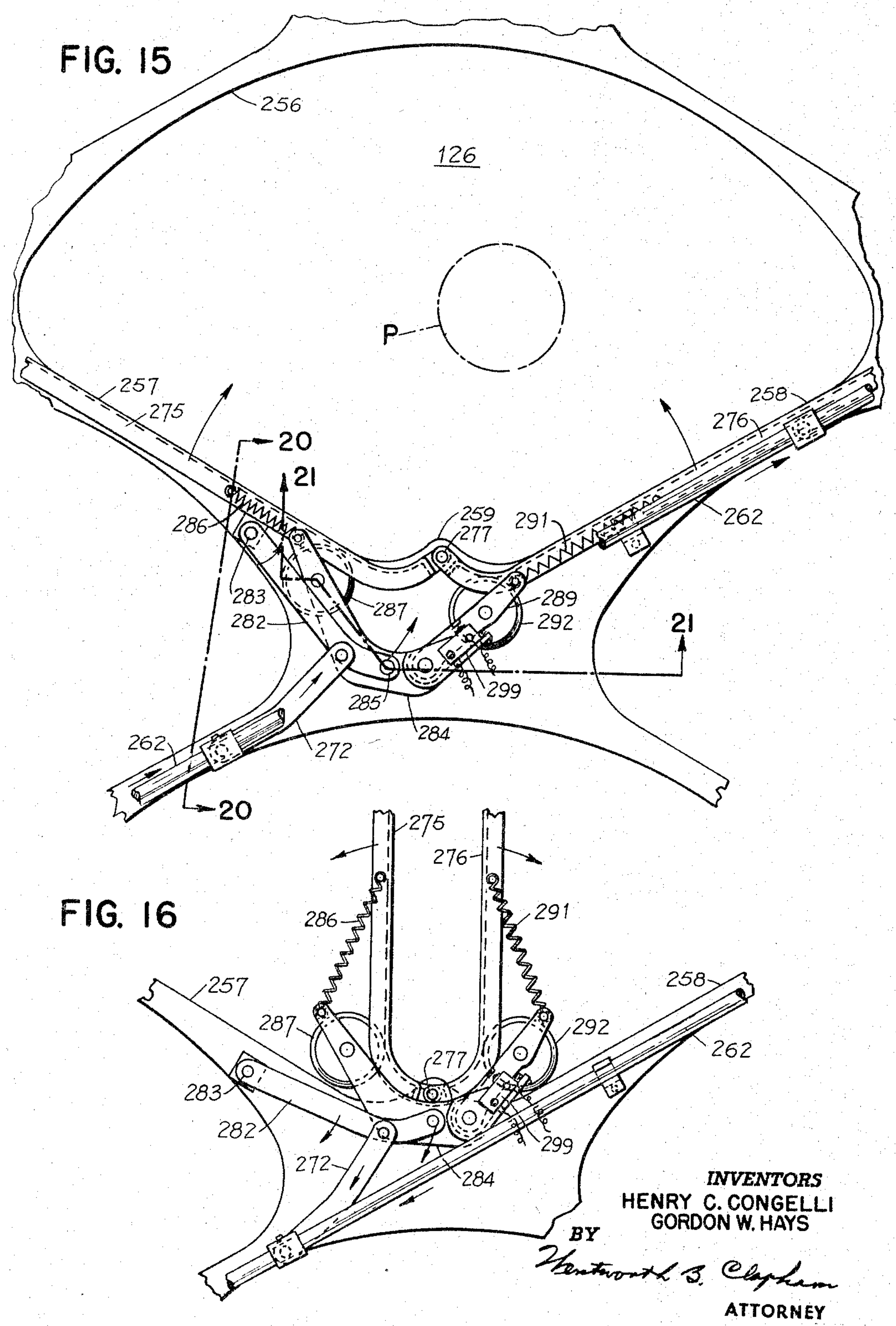
FIGURES 15 and 16 are plan views illustrating some of the principles of operation of the respotting units.
Figures 17, 18, 19:
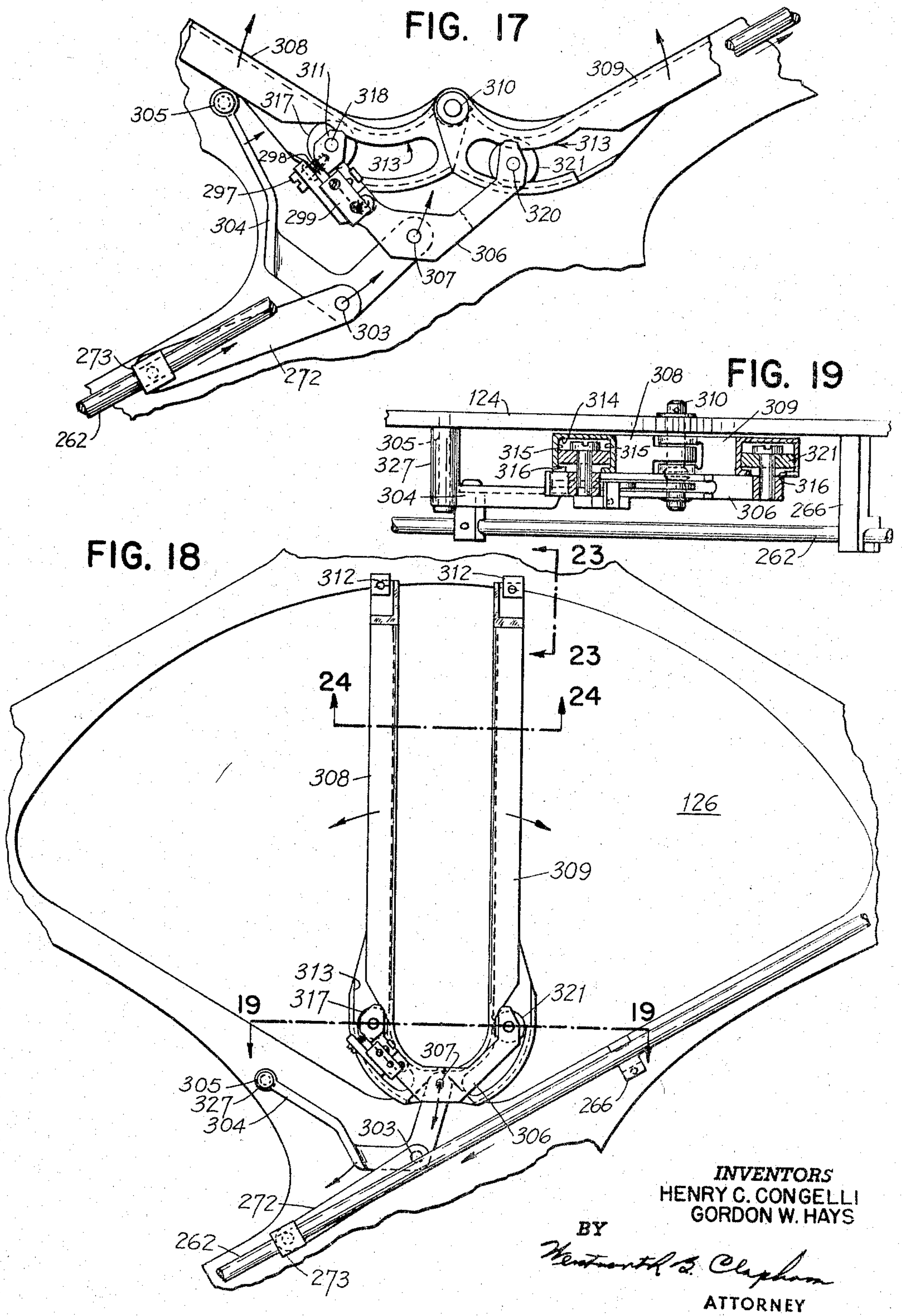
FIGURE 17 is a plan view similar to FIGURE 15 of a modified form of grippers and their actuating mechanism.
FIGURE 18 is a plan view of the embodiment of FIGURE 17, illustrating the grippers in a closed position.
FIGURE 19 is a sectional side elevational view, taken on line 19—19 in FIGURE 18.
Figure 24:
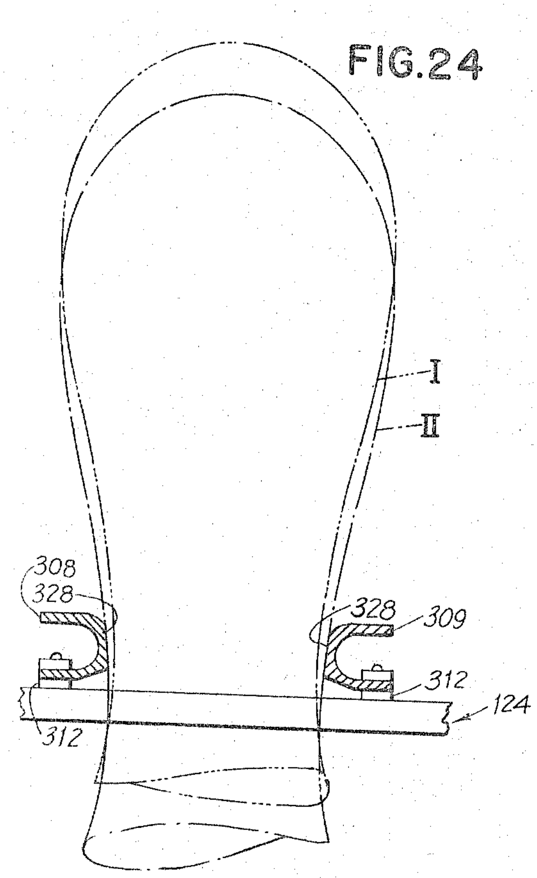
Figures 20, 22:
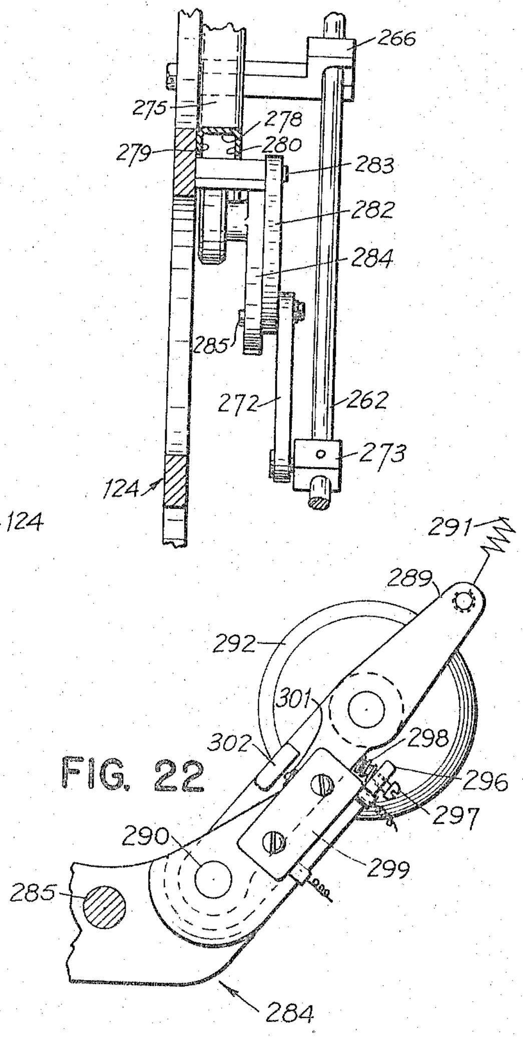
Figure 23:
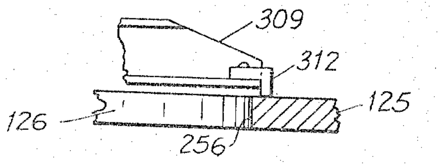
Figure 21:
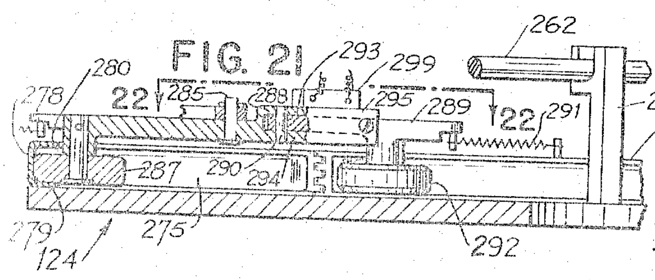

FIGURES 20 and 21 are vertical sectional views taken on lines 20—20 and 21—21, respectively, in FIGURE 15, FIGURE 22 is a plan view, on an enlarged scale for clarity, looking along line 22—22 in FIGURE 21;

FIGURE 23 is an elevational view, looking along line 23—23 in FIGURE 18; and FIGURE 24 is an elevational view, partly in section, taken along line 24—24 in FIGURE 18 and illustrating the relationship of the grippers, when in closed position, to a bowling pin being picked up thereby.

Figure 1:
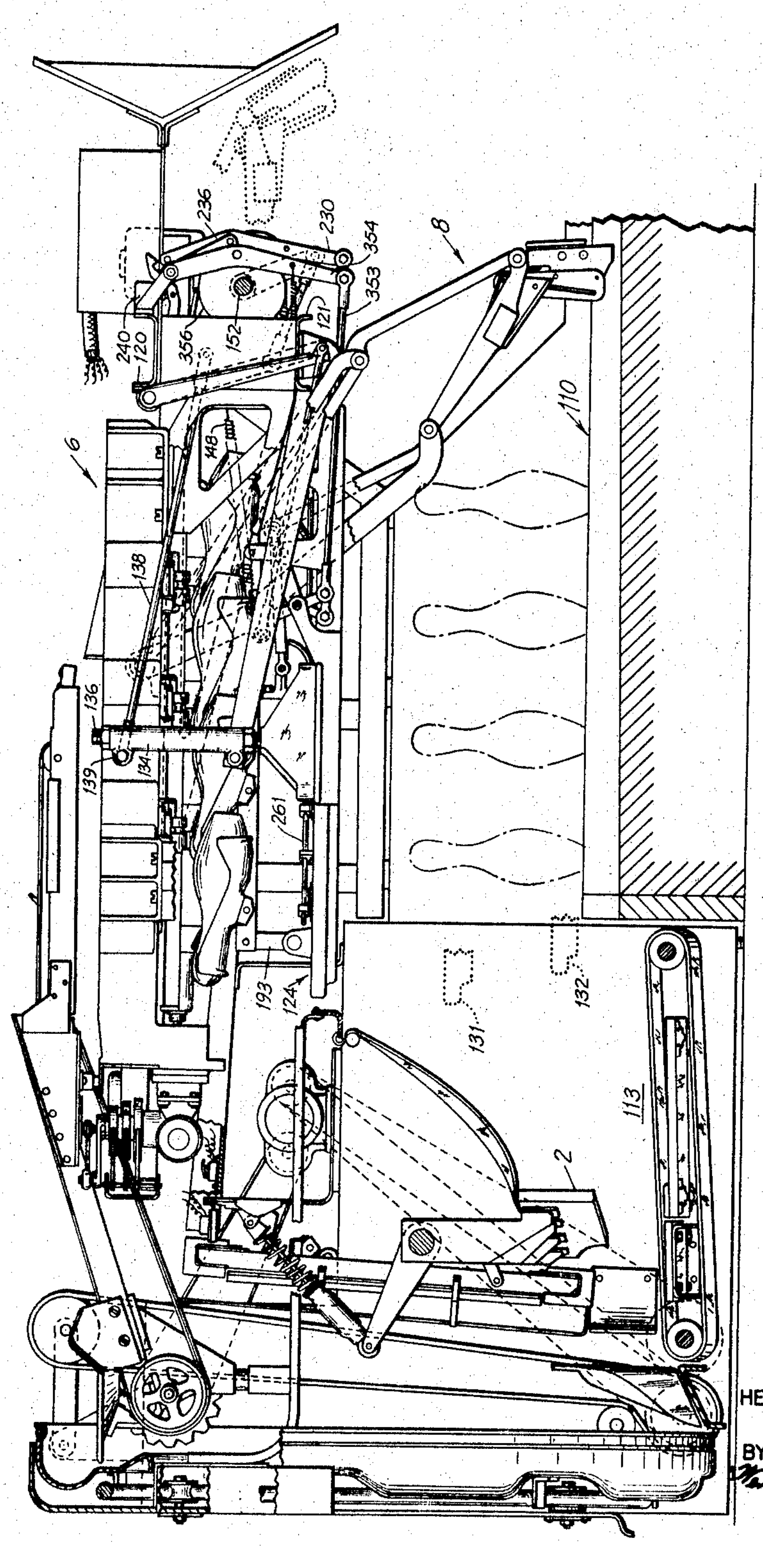
FIGURE 1 is a side elevation of a bowling pin spotting machine embodying the invention.
Figure 1A:
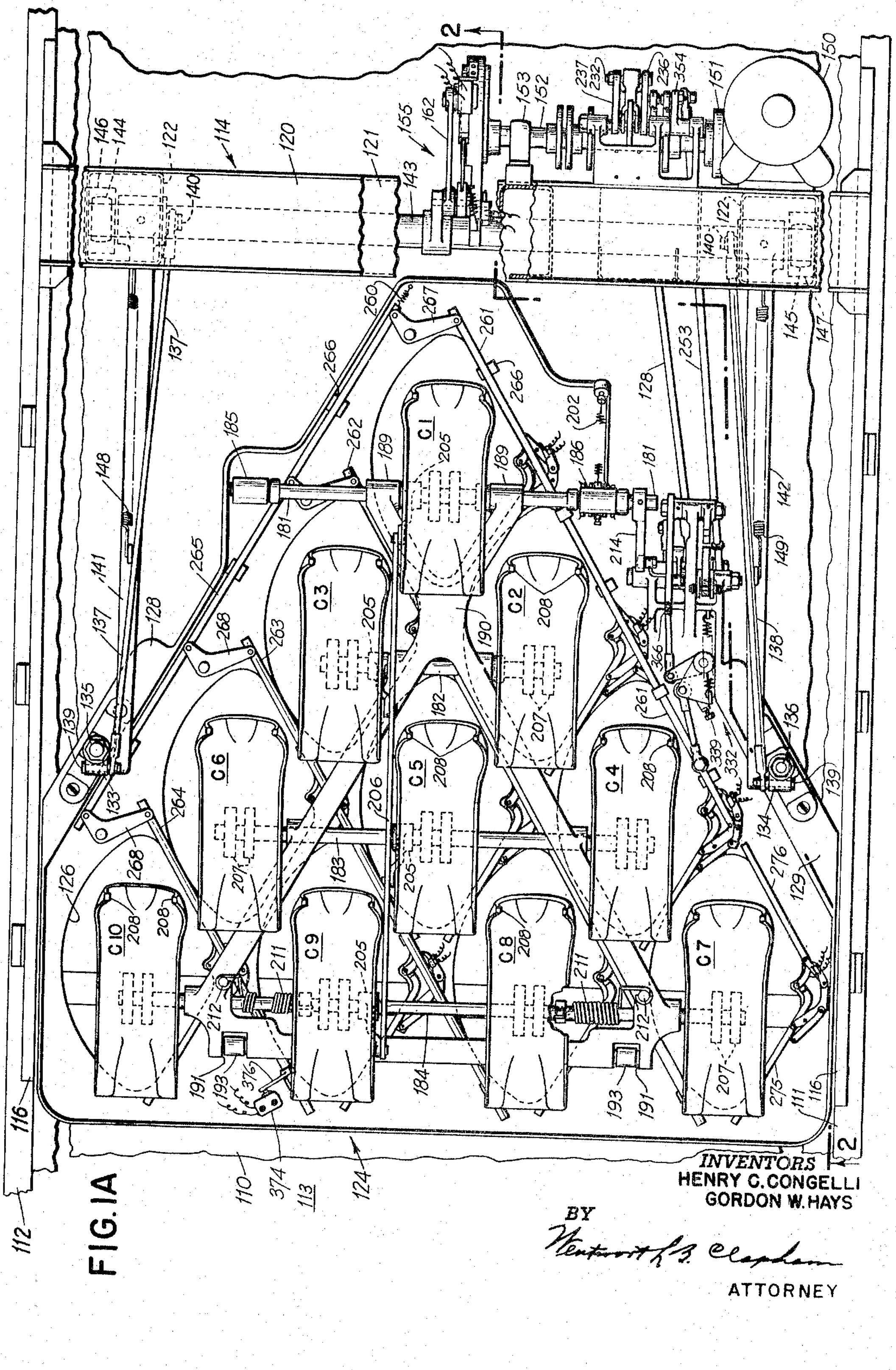
FIGURE 1A is a top plan view of a preferred form of spotting and respotting mechanism embodying the invention, with parts broken away.
Figure 2:
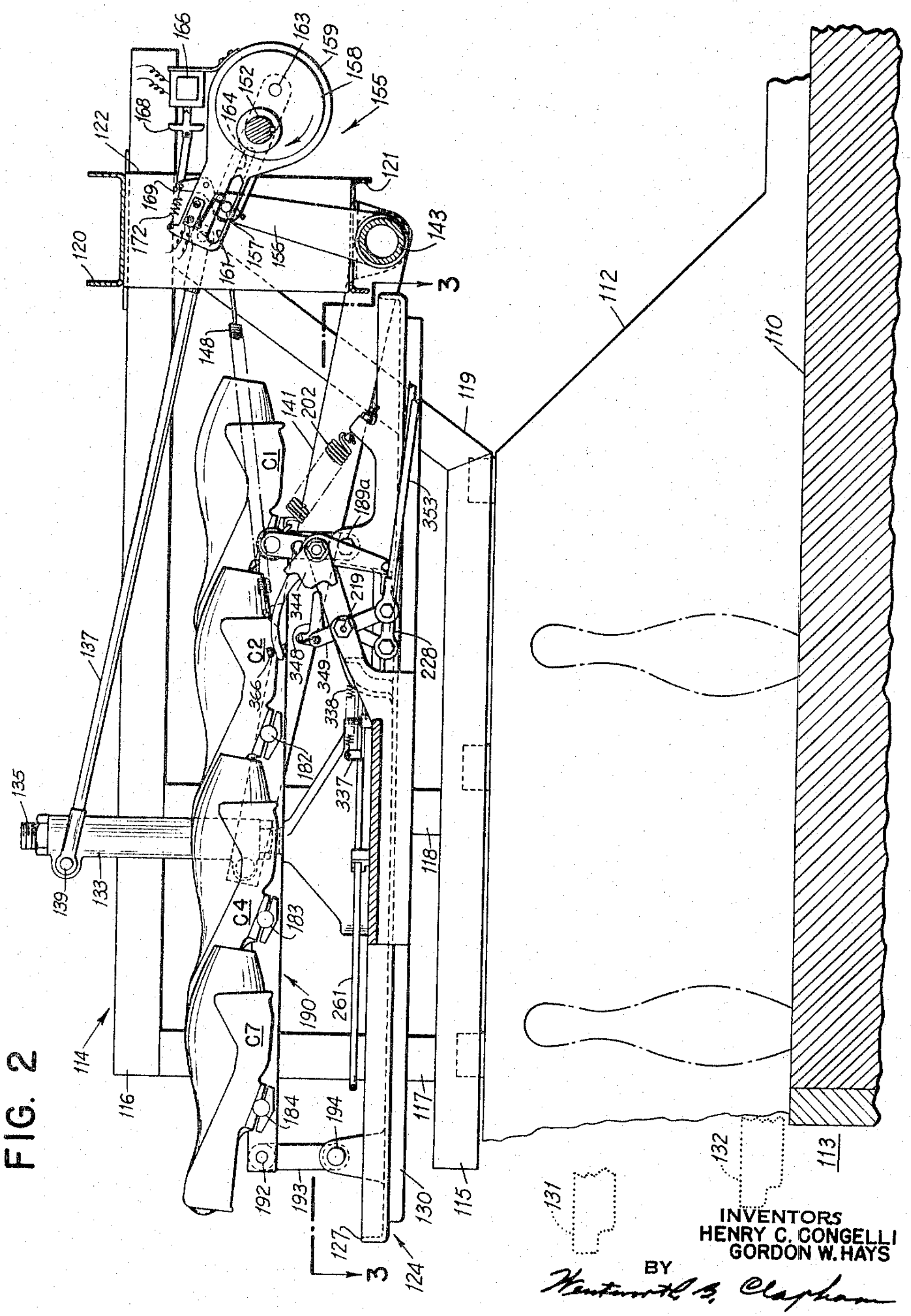
FIGURE 2 is a side sectional elevational view taken on line 2—2 in FIGURE 1A.

Although the invention can be adapted to other types of bowling games, it has been illustrated as applied to the game of ten pins. Referring now to the drawings and more specifically to FIGURES 1, 1A and 2, there is illustrated a bowling alley installation, which comprises a pin deck or alley 110 upon which the pins are supported in the usual triangular formation, a pair of spaced parallel kickbacks 111 and 112 which extend along the sides of the alley and of the pit, and a pit 113 which lies rearwardly of alley 110.

A support frame 114 is mounted on and supported by kickbacks 111 and 112 and comprises a pair of sides which extend upwardly from the kickbacks and a transverse portion which extends between the sides. Each side of frame 114 includes a pair of parallel, horizontal, vertically-spaced bars 116, a pair of parallel vertical bars 117 and 118 connected at their ends to bars 116, and an inclined bar 19 connected to bars 116, as illustrated in FIGURE 2. The sides of frame 114 are inter-connected by a pair of horizontal, U-shaped channel members 120 and 121 which extend transversely of the alley at the front of frame 114. Channel member 120 overlies channel member 121, channel member 120 opening upwardly and channel member 121 opening downwardly. The frame also includes a plurality of vertical members 122 which extend between channel members 120 and 121 and support various portions of the apparatus, as will be apparent hereinafter.

*Table*

Frame 114 supports a bowling pin spotting-respotting mechanism comprising a rigid, horizontal table 124 which is best seen in FIGURES 1, 1A, 2 and 3. Referring now to these figures, which show a preferred form of the invention, table 124 comprises a body 125 having a plurality of apertures designated generally 126, a strengthening rib 127, a pair of flanges 128 and 129, and a strengthening rib 130. Body portion 125 is flat and horizontal and has a substantially equilateral triangular shape, the apex of the body portion pointing toward the front of a bowling alley and the side thereof opposite the apex (i.e., the rear edge) extending transversely of the alley. Rib 127 extends upwardly from the periphery of body portion 125, whereas rib 130 extends downwardly from body portion 125 and lies inwardly of and beneath the upper rib 127. Flanges 128 and 129 are horizontal and extend outwardly from the upper portion of rib 127 on opposite sides of table 124. As will be apparent hereafter, the respotting units and the spotting cups are supported above table 124 so that the table protects these elements from flying pins.

Table 124 is disposed to the rear of channel members 120 and 121 for vertical arcuate movement relative to pin deck 110 between a dwell position, indicated by the full lines of FIGURE 2, a first lower position, indicated by dotted lines 131 in FIGURE 2, and a second lower position, indicated by dotted lines 132 in FIGURE 2, the table being mounted so that it remains horizontal at all times.

As shown in FIGURES 1, 1A and 2, table 124 is supported by a pair of laterally spaced, vertical posts 135 and 136 provided with bases which are rigidly secured to flanges 128 and 129. Flanges 128 and 129 are located adjacent to that portion of the respotting-spotting mechanism corresponding to the #4 pin and the #6 pin so that a line extending between the posts passes closely adjacent to the center of gravity of the table and components supported thereon whereby there is little tendency for the table to tip or pivot about a horizontal line extending between the posts.

Posts 135 and 136 are partially enclosed in and support a pair of tubular, vertical, table post housings 133 and 134. Pivotally connected to table posts housings 133 and 134 adjacent the upper ends thereof are a pair of tie rods 137 and 138 which extend longitudinally and lie in the same plane. The front ends of tie rods 137 and 138 are secured to frame 114 by a pair of pivot pins 140 whereas the rear ends of tie rods 137 and 138 are secured to the post housings by pivot pins 139.

A pair of table support arms 141 and 142 have their rear ends pivotally connected to post housings 133 and 134 respectively, beneath the connection thereto of tie rods 137 and 138. The front ends of support arms 141 and 142 are rigidly affixed to a torque tube 143 which is horizontal and extends transversely of the alley beneath channel member 121. The ends of torque tube 143 are rotatably supported by a pair of bearings 144 and 145 supported respectively by brackets 146 and 147 which depend from channel member 121. A pair of helical tension springs 148 and 149 have their front ends anchored to frame 114 and their rear ends secured to support arms 141 and 142, respectively, and bias the support arms in a clockwise direction as viewed in FIGURE 2.

When the table is in its dwell position, support arms 141 and 142 and tie rods 137 and 138 extend rearwardly and upwardly so that as the table is lowered from its dwell position, it moves at first through an arc having a rearward component of motion. After the tie rods and support rods have passed through a horizontal position, the arc has a forward component, so that, when the table moves into either lower position, the table is moving downwardly and forwardly relative to alley 110. As the table is raised, the direction of the above components of the arc of movement are reversed.

Pins 140 have their axes located substantially vertically above the axis of tube 143 a distance corresponding to the vertical spacing of pins 139 above those pins which connect support arms 141 and 142 to the post housings. Thus, tie rod 137, post housing 133 and support arm 141 form three sides of a parallelogram and tie rod 138, post housing 134 and support arm 142 form three sides of a similar parallelogram whereby rotation of torque tube 143 causes post housings 133 and 134 to be swung vertically so that post housings 133 and 134 remain vertical and thereby cause table 124 to remain horizontal.

*Primary drive mechanism*

Referring now to FIGURES 1 and 1A, a selectively energizable, electric motor 150 is supported in front of channel members 121 and 120 and is connected to a gear speed reduction box 151 for driving an output shaft 152 at a constant speed. Output shaft 152 is mounted in front of and at a height approximately midway between channel members 120 and 121. The shaft is supported by a bearing 153 in addition to the support afforded by box 151. Shaft 152 is horizontal and transverse and terminates approximately halfway across the alley. That is, motor 150 and box 151 are located adjacent to the left side of the alley, looking from the front of the alley, and the end of shaft 152 terminates approximately along the center line of the alley. Motor 150 and box 151 are constructed so that operation of the motor causes shaft 152 to rotate in a clockwise direction as viewed in FIGURE 2, this shaft being operative to drive the table, the spotting units in a manner more fully described hereafter.

*Table drive mechanism*

Table 124 is driven by shaft 152 and a mechanism indicated generally by reference numeral 155 in FIGS. 1, 1A, 2, 7 and 8. As best seen in these figures, the table drive mechanism comprises a table lift arm 156 provided at its lower end with a boss rigidly secured preferably to the middle of tube 143 so that rotation of arm 156 causes rotation of tube 143. Arm 156 extends upwardly from tube 143 and carries at its upper end a slider pin 157.

A circular eccentric 158 is secured to the end of shaft 152 for rotation therewith. Eccentric 158 is rotatably received in and supports an annular strap member 159 provided with a rearward extension 160 having an elongated slot 161 which receives pin 157. A link 162 is pivotally connected at one end to a horizontal pivot pin 163 carried by eccentric 158 and projects therefrom on the side opposite to shaft 152. Link 162 is provided with a slot 164 which also receives pin 157, link 162 being located between arm 156 and extension 160.

A solenoid 166 is mounted on a bracket 167 secured to strap member 159. Solenoid 166 is associated with a plunger 168 connected to one end of bell crank lever 169 pivotally mounted on pin 170 secured to extension 160 above slot 161. Lever 169 is connected to one end of a helical tension spring 172 which is connected at its other end to a lug 174 that extends upwardly from and is integral with extension 160. The free end of lever 169 is provided with a hook 171 which oscillates or pivots in a plane that extends transversely of and intersects pin 157 between link 162 and extension 160, the hook being operative to shorten the effective length of the slots. Mounted on extension 160 is a switch 175 having an actuator 176 engageable with pin 157, when the pin is held by hook 171.

The weight of the table, along with that of the parts supported theron, acting through support arms 141 and 142 and torque tube 143, biases arm 156 counterclockwise as viewed in FIGURE 2. Similarly, springs 148 and 149 bias arm 156 clockwise, but the strength of springs 148 and 149 is such that, when there are no bowling pins supported by the table, the bias due to the weight of the table and supported parts is greater than and overcomes the bias due to springs 148 and 149 so that the net effect is to bias arm 156 at all times, in a counterclockwise direction, whereby pin 157 is biased toward the left ends of slots 161 and 164 as viewed in FIGURE 7. When there are some bowling pins supported by the table, the bias is even greater.

*Operation of table drive mechanism*

Motor 150 and solenoid 166 are adapted to be controlled by an electric control system which causes the table to be driven through a spotting cycle and a respotting cycle. In the spotting cycle, the table is lowered from its dwell position to position 132 (FIGURE 2) and is then raised back into the dwell position. During the respotting cycle, the table is twice lowered and raised between the dwell position and position 131 (FIGURE 2), once to allow standing pins to be picked up and the alley to be swept, and once to allow the pins to be respotted.

Prior to the start of either cycle, the movable parts of the mechanism occupy the positions in FIGURE 2 and are described as follows: Solenoid 166 is deenergized, allowing spring 172 to hold plunger 168 in the unattracted position and hook 171 in operative engagement with pin 157. The axes of pins 157 and 163 and of shaft 152 are aligned with the pins being located on opposite sides of the shaft so that crank arm 156 is in its clockwise-most position and table 124 is in the dwell position. Pin 157 engages the left end of slot 164 in link 162 and lies midway between the ends of slot 161.

At the start and stop of both cycles, motor 150 is operated and shut off respectively. During operation of the motor, shaft 152 rotates clockwise (FIGURE 2) until it has rotated either one revolution for the spotting cycle, or two revolutions for the respotting cycle. During the respotting cycle, solenoid 166 is deenergized whereas during the spotting cycle the solenoid is energized.

*Table drive—spotting cycle*

When solenoid 166 is energized at the start of the spotting cycle, plunger 168 is attracted and thereby pivots lever 169 against the bias of spring 172 so that hook 171 is pivoted out of engagement with pin 157. Rotation of shaft 152 causes link 162 to move relative to member 159. Since hook 171 is disengaged from pin 157, the pin slides along slot 161, the pin remaining in engagement with the left end of slot 164 during such sliding movement since link 162 is supporting table T by means of pins 157 and 163. As pin 157 slides back and forth through slot 161, crank arm 156 oscillates about the axis of the tube 143, causing table 124 to be lowered and raised. Due to the weight bias of the table, as pointed out above, motor 150 does not supply any power for positively lowering the table, but the motor does supply the necessary force to overcome the weight bias of the table and thereby raise the table from its lowered positions into is dwell position.

*Table drive—respotting cycle*

When shaft 152 begins to rotate at the start of a respotting cycle, the left end of the slot 164 in link 162 moves away from or disengages pin 157, the pin remaining in engagement with hook 171 throughout the cycle since solenoid 166 is now deenergized. Hook 171 is shaped so that the biasing force of the table is directed through and taken up by pivot pin 170, thus eliminating tendency for this biasing force to pivot hook 171 out of engagement with pin 157.

It will be seen that the hook is shaped so that most of the biasing force of the table is taken up by pivot pin 170 rather than spring 172. Thus, during the respotting cycle, rotary motion of shaft 152 is transformed or translated into an oscillating movement of crank arm 156 which movement occurs through an arc smaller than that which occurs during the spotting cycle so that the table is lowered into and raised from position 131 (FIGURES 1 and 2) whereby such position is located above the lowermost position of travel of the table during the spotting cycle. During both cycles, the motion imparted to table 124 is harmonic so that the lowering speed is reduced as the table moves into its lowest position of each cycle to enable bowling pins to be gently spotted and respotted on the alley.

*Spotting units*

As best seen in FIGURES 1, 1A, 2 and 4–6, a plurality of pin spotting cups C1–C10 are mounted on a plurality of shafts 181–184, cup C1 being mounted on shaft 181, cups C2 and C3 being mounted on shaft 182, cups C4, C5 and C6 being mounted on shaft 183, and cups C7, C8, C9 and C10 being mounted on shaft 184. Shaft 181 is rotatably supported at opposite ends of the upper ends of a pair of laterally spaced parallel support arms 185, 186 which are pivotally mounted on a pair of pivot pins 187 supported by table 124. A yoke 190, in the form of a generally open frame having a V-shaped front portion and a triangular-shaped rear portion, has a pair of laterally spaced bosses 189 through which shaft 181 extends, so that the front portion of the yoke is supported by shaft 181. Bosses 189 straddle cup C1.

Yoke 190, at its rear edge, has a pair of laterally spaced recesses 191 in which a pair of pivot pins 192 are mounted, the pivot pins being aligned and extending transversely and horizontally. A pair of laterally spaced support arms 193 have their upper ends pivotally mounted on pivot pins 192 and their lower ends pivotally mounted on a pair of horizontal pins 194 supported by table 124.

The lengths of support arms 185, 186 and 193 are equal and the spacings between pivot pins 192 and 194 and the axis of shaft 181 and pivot pins 189A are the same so that the yoke is supported parallel to and spaced above table 124.

Arm 186 has a downwardly extending portion 197 which is engageable with an adjustable stop screw 198 (FIGURE 6) carried by a lug 199 integral with the table. The upper end of arm 186 has an eyelet connected to the rear end of a helical tension spring 202 having its forward end anchored by an inclined bolt 203 (FIGURES 4 and 5) secured to table 124. Spring 202 biases arm 186 clockwise, as viewed in FIGURES 4–6, and thereby biases yoke 190 forwardly and upwardly into the position shown in FIGURE 1, so that portion 197 engages stop screw 198, as shown in FIGURE 6.

Figures 4, 5, 6:
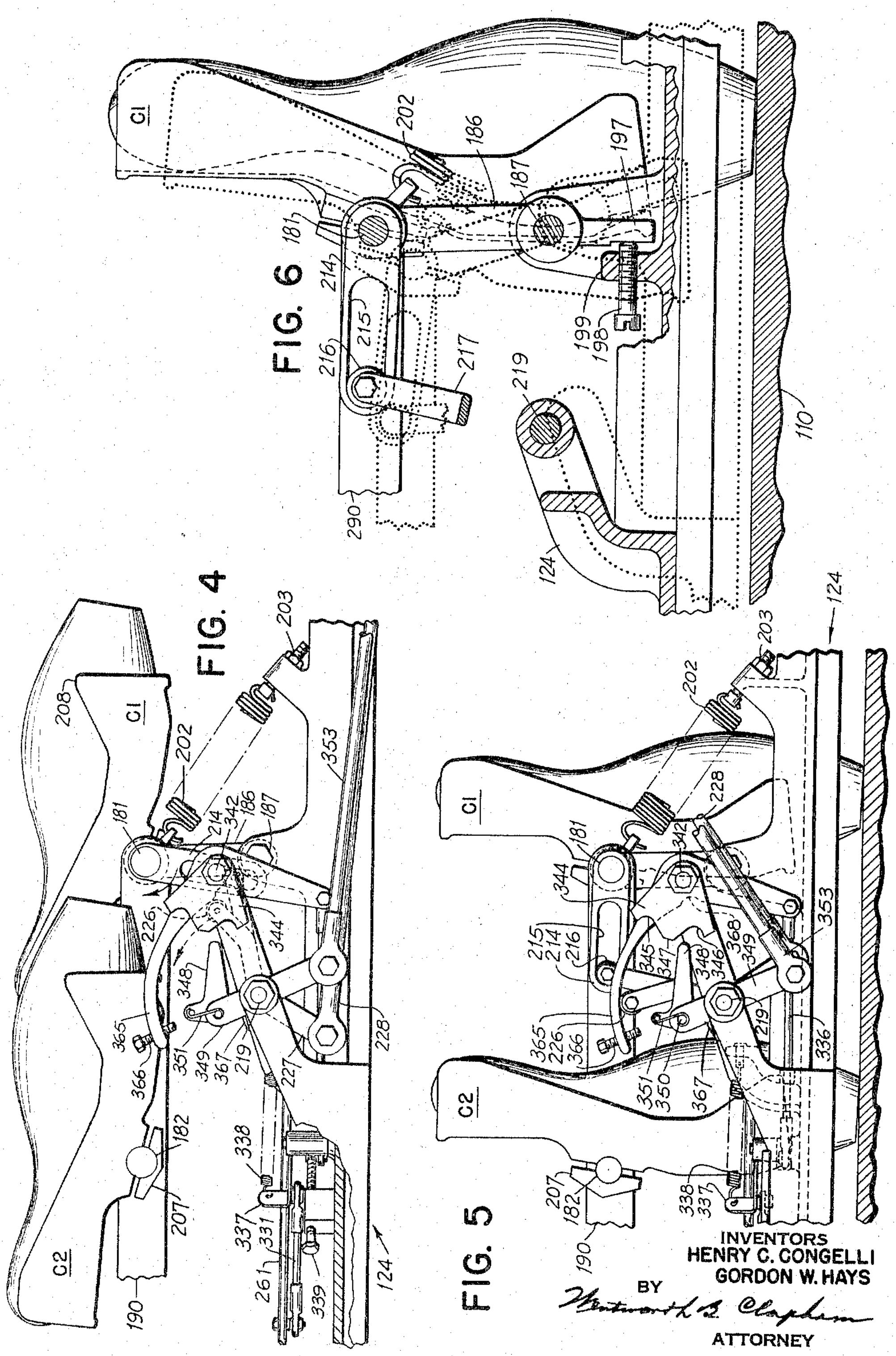
FIGURES 4 and 5 are side elevational views illustrating a portion of the spot-respot operating mechanism.
FIGURE 6 is a side elevational view, partly in section, illustrating a pin spotter placing a pin on a bowling alley.

In the above position, which is indicated by the full lines in FIGURE 6, arms 185, 186 and 193 are vertical and yoke 190 is at a maximum distance above table 124.

As pointed out hereafter, yoke 190 is movable from this position in such a manner that the yoke remains parallel to the table. Since the arms are vertical, yoke 190 extends perpendicular thereto so that, when the yoke moves from this position, the initial movement is rearward or to the left as viewed in FIGURE 2, and substantially along a horizontal arc relative to the table, such movement being used for the purpose of moving spotting cups C1–C10 clear of pins thereby spotted on the alley.

Yoke 190 is provided with a plurality of bosses, similar to bosses 189, which support shafts 182–184 in parallel relationship and one behind the other, as shown in FIGURE 1A. A plurality of cranks 205 have their lower ends supported on shafts 181–184 and have their upper ends connected to a tie rod 206. Cranks 205 are of equal length and extend at the same angle relative to the shaft supporting each one whereby rotation of shaft 181 causes shafts 182–184 to rotate both simultaneously and through the same angular displacement.

As shown herein C1–C10 are mounted on shafts 181–184 in a triangular relationship corresponding to the positions of the pins spotted on the alley. Cup C1 is adapted to support that pin which, when spotted on the alley, is the #1 pin, cup C2 is adapted to support that pin which, when spotted on the alley is the #2 pin, etc.

The cups are identical, so that only one need be described in detail. With reference to cup C2, as shown in FIGURES 1A, 4 and 5, each cup is secured to the shaft by a cap 207 which clamps the shaft between the cap and the bottom of the cup at a point approximately midway the length of the cap. Each cup is formed of a suitable material, such as sheet metal and is curved to conform generally to the curvature of the portion of the pin engaged thereby. The rear portion of each cup is adapted to support the head of a bowling pin and the front portion of each cup is adapted to support the belly of a bowling pin, so that the resultant center of gravity of each pin and of the cup supporting it is located forwardly of the shaft, whereby pins supported in the cups bias the shafts clockwise, as viewed in FIGURE 2. Each cup is of a length less than that of a bowling pin and has, at its forward end a curved tip portion 208 which encircles the pin adjacent to the base thereof throughout an arc slightly greater than 180 deg., so that, when each pin is swung into a position to be spotted on the table, tip portion 208 prevents the pin from sliding out of the cup yet allows the pin to be released.

The shafts are operated in a timed relationship to movement of table 124 so that, when each pin is swung into a position to be spotted on the table, tip portion 208 prevents the pin from sliding out of the cup yet allows the pin to be released.

The shafts are operated in a timed relationship to movement of table 124 so that, when it is in its dwell position, the cups are positioned as shown in FIGURES 1, 1A and 2. In such positions, the cups are adapted to receive a set of bowling pins from a distributor and to support such pins in a generally horizontal orientation with the bases of the pins pointing toward the front of the alley and with the axes of the pins parallel and inclined downwardly and forwardly at a suitable angle such as an angle of about 5 deg. so that the pins are seated in the cups. Then, as will be pointed out more specifically hereafter, at the appropriate portions of the spotting cycle, the cups are pivoted from their pin receiving positions to pin depositing positions, the pins are placed on the alley, and the cups are moved clear of the pins and back to the pin receiving positions. During the respotting cycle, the cups remain substantially horizontal and in their pin receiving positions so as not to interfere with the operation of the respotting units.

The distributing mechanism which delivers pins to pin storate 6 from which they are in turn delivered to cups C1–C10 is of the type shown in copending application Ser. No. 195,928, filed May 18, 1962, and now Patent No. 3,248,109, by Roy E. Blewitt and James D. Elliott, for Bowling Pin Distributing Mechanism, or in copending application Ser. No. 195,921, filed May 18, 1962, and now Patent No. 3,248,108, by Henry C. Congelli, Gordon W. Hays and Charles E. Schon, for Pin Distributor Apparatus. Since this mechanism forms no specific part of the present invention further description and showing thereof is omitted in the interest of brevity.

Each cup C is associated with a different one of apertures 126 so that, as each cup is rotated into its pin spotting position, the pin is swung from a position where it is wholly above the table to a position where it extends through the associated aperture whereby the base of the pin is below the table.

As best seen in FIGURE 1A, a pair of oppositely wound torsion springs 211 are supported on and encircle opposite ends of shaft 184. Springs 211 have one end anchored to shaft 184 and have their other end anchored on yoke 190 by a pin 212. Springs 211 bias shaft 184 in a counterclockwise direction and, through crank arms 205 and tie rod 206, bias shafts 181–83 in counterclockwise directions.

*Spotting units drive mechanism*

Figures 13, 14:
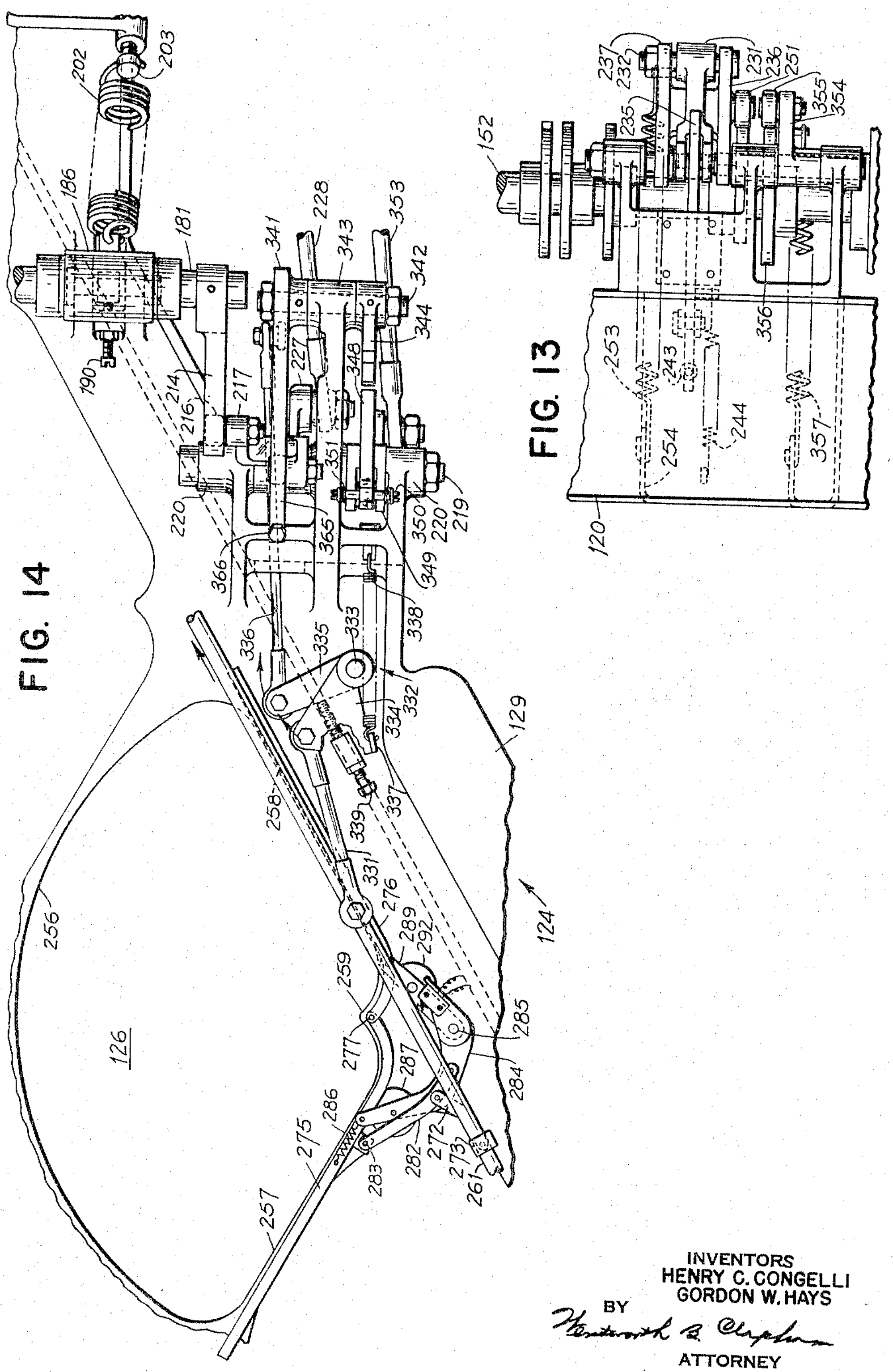
FIGURE 13 is a plan view looking along line 13—13 in FIGURE 10.
FIGURE 14 is a plan view of the #4 pin respotting unit and of that portion of the spotting-respotting actuating mechanism, illustrated in FIGURES 4, 5 and 9.

As best seen in FIGURES 6 and 14, an arm 214 is mounted on the end of shaft 181 adjacent to support arm 186, arm 214 being effective to drive shaft 181 to rotate the spotting cups and to move the yoke rearwardly to clear pins spotted on the alley. Arm 214 extends radially from the axis of shaft 181 and is provided with a slot 215 which receives a roller 216 carried by lever 217.

As best seen in FIGURES 4, 5 and 14, lever 217 is supported on a short shaft or transverse pivot pin 219, between a pair of laterally spaced lugs 220 integral with table 124. Lever 217 is irregularly shaped and has a first upwardly extending portion supporting roller 216, a second upwardly extending portion supporting a roller 226, and a downwardly extending portion 227, connected to the rear end of a tie rod 228. This tie rod extends forwardly and, at its forward end, is pivotally connected to the lower end of a lever 230 (see FIGURE 10).

Figures 7, 8, 9:
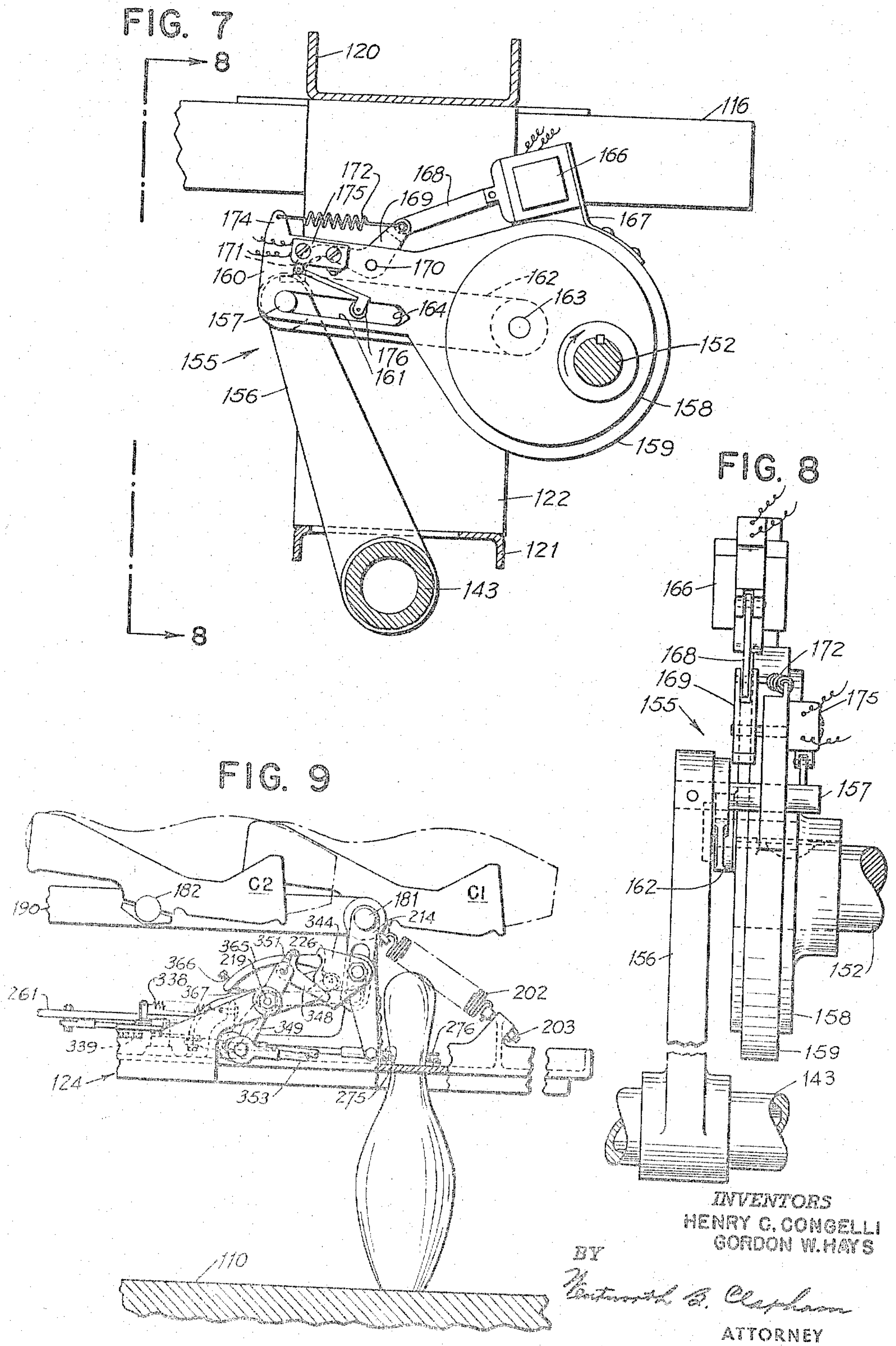
FIGURE 7 is a side elevational view, partly in section, illustrating a portion of the table actuating mechanism.
FIGURE 8 is a rear elevational view looking along line 8—8 in FIGURE 7.
FIGURE 9 is a side elevational view of the portion of spot-respot actuating mechanism shown in FIGURES 4 and 5 in a different operative stage.

When the cups are in pin receiving position, as shown in FIGURES 1, 2 and 9, arm 214 extends downwardly and roller 216 engages the outer end of slot 215 (FIGURE 9). During the spotting cycle, rod 228 is moved generally longitudinally along its axis and rotates lever 217, which in turn rotates arm 214 between the position shown in FIGURE 9 and a position where the arm extends substantially horizontally and rearwardly of shaft 181 and roller 216 engages the left end of slot 215, as shown in FIGURES 5 and 6. Lever 217 is effective to move yoke 190 relative to table T, when arm 214 extends to the rear, and roller 216 engages the outer end of slot 215, as viewed in FIGURES 5 and 6, so that the cups C1–C10 are moved clear of pins spotted thereby on alley 110.

Referring now to FIGURES 10–13, lever 230 has a medial hub 231 rotatably supported by a pivot pin 232. Lever 230 also has an upwardly extending forked end 233 which supports a pin 234 engageable with a latch hook 235. Pin 232 is supported by the lower ends of a link having a pair of parallel, spaced arms 236 and 237 connected by a web. The upper ends of arms 236 and 237 are pivotally supported by pivot pins 238 and 239, respectively, carried by a bracket 240 secured to the upper channel member 120. Pins 234, 238 and 239 have their axes equidistant from the axis of pin 232 so that pin 234 can be brought into alignment with pins 238 and 239.

Latch hook 235 is in the form of a lever, pivotally mounted on pin 241 supported by bracket 242 which depends on frame member 120. Hook 235 carries at one end an adjustable stop screw 243 engageable with the under surface of channel member 120. A spring 244 biases latch hook 235 clockwise, as viewed in FIGURES 10 and 11, toward engagement with pin 234.

A solenoid 246 is mounted on bracket 240 and has a vertically movable plunger 247 which at its lower end is connected to latch hook 235 at a point between the operative end of latch hook 235 and the point of connection of spring 244. When solenoid 246 is energized at the start of a respotting cycle, plunger 247 is attracted and pivots or raises latch hook 235 to the position shown in FIGURE 11. When solenoid 246 is deenergized, spring 244 biases latch hook 235 to the position shown in FIGURE 10 and biases solenoid plunger 247 to its unactuated position. Thus, during a spotting cycle, when table 124 is moved to and from alley A in spotting pins thereon, recess 248 of latch hook 235 remains in engagement with pin 234.

Recess 248 is so shaped that the lines of action of forces applied to latch hook 235 by pin 234 pass through pivot pin 234, thus eliminating any tendency for these forces to cause disengagement of pin 234 from recess 248. As above described, when the table is in its dwell position and the spotting cups are in their pin receiving positions, roller 216 is bottomed radially outwardly in the slot in arm 214, thus preventing further clockwise rotation of arm 227 and preventing further rearward movement of tie rod 228. The restraint afforded the lower end of arm 230 by rod 228, coupled with the restraint afforded by the profile of cam 252 acting upon arm 230, as described below, through cam roller 251, link 236, and pin 232, establishes the position of arm 230 and pin 234 against the biasing force of spring 253. This establishment of the position of pin 234 when the table is in dwell position permits recess 248 to be further so shaped that a slight clearance exists between the recess and pin 234, thus permitting engagement and disengagement of latch hook 235 under no load conditions.

Arm 236 carries a roller 251 engageable with cam 252 mounted on shaft 152 for rotation therewith. A helical tension spring 253 is connected at one end to a point intermediate the lower end of lever 230 and cam follows 251. The other end of spring 253 is connected to a bracket 254 mounted on lower channel member 121. When solenoid 246 is deenergized, and latch hook 235 engages pin 234, rotation of shaft 152 rotates cam 252 whereby variations in the cam profile cause lever 230 to pivot about pin 234 and thereby transmit to lever 217 through rod 228, movement proportional to the variation in the cam profile. However, when solenoid 246 is energized and latch hook 235 is disengaged from pin 234, rotation of cam 252 causes lever 230 to pivot under the biasing of spring 253 about its connection to rod 228 using pin 232 as the fulcrum and thereby cause the upper end 233 of lever 230 and pin 234 to move an amount proportional to the variation in cam profile.

*Respotting units*

A plurality of respotting units designated generally 110, are mounted on table 124, each in association with a different one of apertures 126. With reference to FIGURE 14, each aperture is sector shaped with an arcuate portion 256, an apex 259, and generally straight, divergent side portions 257 and 258 extending between apex 259 and the ends of arcuate portion 256 at substantially an angle of 120 deg. Arcuate portion 256 subtends a chord or major axis which extends longitudinally of the alley. The bisector of the angle between side portions 257 and 258 constitutes a minor axis extending transversely of the alley. This construction allows each aperture to be proportioned so that it provides an effective area for offspot coverage of at least 55.5 square inches and allows the base of each pin to be swung through an aperture, during the appropriate portion of the spotting cycle, so that such pin can be spotted on the alley.

Figure 3:
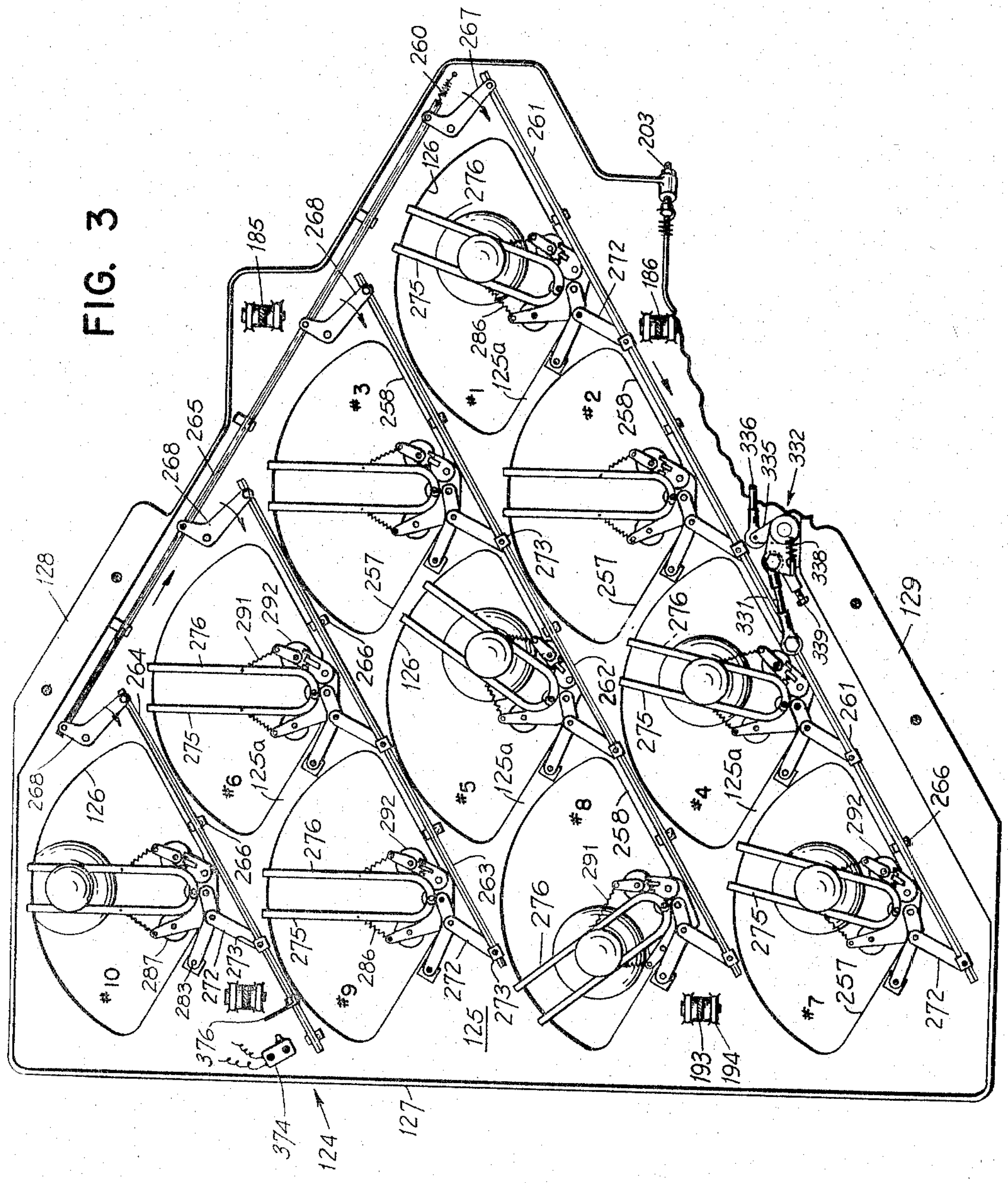
FIGURE 3 is a plan view, taken along line 3—3 in FIGURE 2.

Apertures 126 which, as shown, are generally fan-shaped in form, are arranged as illustrated in FIGURE 3 in a triangular formation similar to the formation of pins spotted on the alley so that the bissectors of the angle between side portions 257 and 258 are aligned in the apertures positioned corresponding to the #2 and #3 pins, to the #4–#6 pins, and to the #7–#10 pins. Thus, body portion 125 of table 124 comprises a plurality of relatively narrow webs 125A between adjacent apertures, the web being of a width which provides the necessary rigidity for the table and sufficient area or base on which to support and nest the parts mounted thereon. Thus, an out of range pin standing on alley 10 will engage the undersurface of body portion 125 and not be able to damage the grippers 275 or 276.

FIGURE 15 discloses a typical respotter unit 126 and shows the relative positions between the respotter grippers 275 and 276 (or 308 and 309) described more in detail hereinafter, and a normal on-spot standing pin P. The longitudinal axis of pin P is located in front of or to the right of line A—A which bisects the angle between the side walls 257 and 258 of aperture 126. This construction has been found to be highly desirable because when a pin is struck by a ball or another pin and does not fall down, the tendency is for it to "walk" or shift to the left of line A—A or rearwardly on pin deck —A. Thus since the area to the left of line A—A is greater than to the right there is more opportunity for the respotter grippers to engage, lift and respot off-spot pins.

As seen in FIGURES 1A and 3, a plurality of connecting rods 261–265 are supported on table 124 by a plurality of lugs 266 each provided with an upwardly opening forked end which slidably receives the rods supported thereby. Lugs 266 support rods 261–265 in a common plane that is parallel to table 124 and spaced vertically thereabove, rods 261–264 being above webs 125A of the table body 25. With respect to each other, rod 261 is a driver rod and rods 262–265 are drive. Rods 261–264 are parallel and rod 265 is oblique to the other rods, all of rods 261–265 being oblique to the alley at approximately 60 deg.

Rod 261 has its forward end fixed to a bell crank lever 267 which, in turn, is connected to the forward end of rod 265. A plurality of bell crank levers 268 are connected between the ends of rods 262–264 and the adjacent portions of rod 265 so that movement of rod 261 along its axis causes all of rods 262–264 to move along their respective axes and through the same longitudinal displacement.

Each respotting unit 110 is connected to one end of a plurality of links 272 each of which is pivotally connected to a collar 273 supported by one of rods 261–264 so that movement of the rods simultaneously actuates the respotting units through links 272. Each of collars 273 is secured to its associated rod by a set screw which can be loosened to adjust each respotting unit. Each of links 272 holds one of the rods 261–264 associated therewith against being moved upwardly and out of lugs 266, such holding being aided by gravity.

As previously indicated, there are disclosed two embodiments of the respotting units, one embodiment being a modified form of the other. Referring now to the embodiment best seen in FIGURES 3, 14–16, and 20–22, each respotting unit comprises a pair of grippers 275 and 276 pivoted about a vertical pin 277 supported on table 124 adjacent to apex 259 of aperture 126, for movement in opposite directions between an open position (FIGURES 14 and 15) and a closed position (FIGURES 3 and 16). Each gripper has a curved end portion attached to vertical pin 277, the curved portion being in the form of a quadrant having an inner radius slightly greater than the minimum radius of the neck of a bowling pin. Each gripper also has an elongated straight portion which extends away from the curved portion. When the grippers are in their open positions, the straight portions extend along the adjacent sides of the aperture 126 associated therewith. The straight portion is sufficiently long so that, when the gripper is moved from its open position, the tip of each gripper overhangs the portion of the table adjacent to the arcuate portion 256 of the aperture associated therewith.

In the construction selected for purposes of illustration each gripper along at least its straight portion has a generally C-shaped transverse cross section. Grippers 275 and 276 are arranged back-to-back so that the C-shaped cross section on one opens away from the other gripper. Grippers 275 and 276 are preferably constructed from a rigid, light-weight metal, such as aluminum or an alloy and are machined with sufficiently close tolerances that they can freely pivot about pin 277 with as little friction as possible. The tips of grippers 275 and 276 are preferably slightly above the table to avoid frictional contact therewith, yet the tips are close enough so that, when a pin is picked up, the weight of such pin flexes the grippers whereby the tips thereof move downwardly and frictionally engage the table to thereby prevent the grippers from being swung while in a closed position and due to the arcuate swing of the table as it is raised and lowered. This arrangement insures that the pin picked up thereby is respotted on the position it occupied prior to being picked up. When the tip portion engages the table, the weight of the pin supported thereby is distributed both between the tip portions and the base portions and thereby relieves pin 277 from supporting the full weight of the pin.

With reference to FIGURES 20 and 21, each gripper comprises a substantially vertical portion 278 which extends between a pair of parallel substantially horizontal flanges 279 and 280. Portion 278 is adapted to engage the neck of a standing pin.

Furthermore, each respotting unit comprises a lever 282 pivotally connected at an intermediate portion to one end of one of links 272 and at one end to a pin 283 supported by table 124. Lever 282 has its other end pivotally connected to an intermediate portion of a yoke 284 by a pivot pin 285. Pins 285 and 277 are substantially equidistant from pin 283 so that movement of lever 282 causes pin 285 to move toward and away from pin 277.

A helical tension spring 286 has one end connected to gripper 275 and its other end connected to one end of yoke 284. Also mounted on this end of the yoke 284 is a roller 287 engaged with the vertical portion 278 of gripper 275 on the side thereof opposite to the side engageable with a bowling pin. That is, roller 287 engages vertical portion 278 between flanges 279 and 280.

Yoke 284 has an enlarged portion provided with a recess 288 that opens toward gripper 276. Recess 288 includes upper and lower walls 293 and 294 and vertical rear wall 295. A support member 289 has one end received in recess 288 and pivotally connected to a pin 290 supported between the upper and lower walls 293 and 294, the support member 289 and yoke 284 forming a yoke assembly. The other end of support member 289 is connected to one end of a helical tension spring 291 having its other end connected to gripper 276. At a medial section, support member 289 pivotally supports a roller 292 engaged with gripper 276 in a manner similar to that by which roller 287 engages gripper 175. Springs 286 and 291 maintain rollers 287 and 292 in contact with grippers 275 and 276 respectively.

As best seen in FIGURE 22, yoke 284 has a tip 296 that projects beyond upper and lower walls 293 and 294. A headed screw 297 threadably mounted on tip 296 and extends into the path of movement of support member 289. A compression spring 298 encircling screw 297 biases support member 289 counterclockwise relative to yoke 284 about pivot pin 290. In this way screw 297 can be adjusted to control the extent of clockwise movement of support member 289 and prevent damage to switch 299.

Mounted upon upper wall 293 is a normally-open microswitch 299 having an actuating button 301 engageable with a lug 302 that extends upwardly from the adjacent portion of support member 289. Lug 302 is normally spaced a short distance from the actuating button, but when a bowling pin is picked up by grippers 275 and 276, the weight of the pin pivots support member 289 slightly relative to pin 290, due to the wedging action of the bowling pin, so that spring 298 is compressed and lug 302 engages and actuates button 301. Each switch 299 can thus be connected to suitable circuitry such as that shown in Patterson et al, Patent 2,338,733 for indicating the presence of a standing pin.

Referring now to FIGURES 15 and 16, grippers 275 and 276 are movable from the open position shown in FIGURE 15 to the closed position shown in FIGURE 16. At the appropriate portion of the respotting cycle, rod 262 is moved in the direction of the arrow in FIGURE 15 and causes lever 282, through the action of link 272, to pivot pin 285 toward pivot pin 277. This movement of pivot pin 285 causes yoke 284 to roll rollers 287 and 292 around the curved base portions of grippers 275 and 276 to cam the grippers from their open position toward each other and into the closed position.

Rollers 287 and 292 are spaced apart a distance such that, when grippers 275 and 276 are in their closed positions, the rollers engage the straight portions of the grippers rather than the curved base portions, so that the weight of a pin, in forcing the grippers apart slightly in response to upward movement of the table, acts normally against the rollers and does not tend to force the yoke toward a position wherein the grippers can open. That is, when a pin is supported by a pair of grippers, the grippers are locked against the weight of a pin by the rollers engaging the straight portions of the grippers. Thus, when the grippers are closed, no additional force is required to hold them closed.

An on-spot pin will have its axis located on line B—B is shown in FIGURE 15, approximately equidistant from the point where line B—B intersects chord 256 and side portion 258 extended. Thus, when in a closed position and engaged with an on-spot pin, grippers 275 and 276 will occupy the position shown in FIGURE 3 for pins #1, #4 and #7. However, when a pin is off-spot, such as indicated in FIGURE 15 or as shown in FIGURE 3 for pins #5, #8, and #10, actuation of the grippers from the open position to the closed position will cause one of grippers 275 or 276 to first engage the pin so that the other gripper is moved to a much greater angle than it normally would be moved. When the grippers are closed, the axis of a pin is located on a line passing through pivot pin 277 drawn parallel to the straight portions of the grippers.

With reference to FIGURE 15, as the grippers are moved to their closed positions, gripper 276 will first engage the neck of the standing pin P and, since the pin is off-spot, such engagement will arrest movement of gripper 276. However, since the grippers move with as little frictional engagement as possible, the force due to engagement between one gripper and an off-spot pin is insufficient to knock over the pin. That is, the weight of a pin is sufficiently great so that the pin is not tilted and so that the pin causes the other gripper to move through the greater angular displacement. When the grippers are closed, the distance between the opposed vertical portions of grippers 275 and 276 is a little greater than the minimum diameter of the neck of the pin. That is, when grippers 275 and 276 are moved into their closed positions, a small clearance, for instance as 1/32" exists between the grippers and the neck of the pin, which clearance, upon subsequent upward movement of the table, is taken up, due to the taper of the neck of the pin whereupon the pins are supported by the grippers in the manner previously described.

When rod 262 is moved rearwardly as in the direction of the arrows in FIGURE 16, lever 282 is pivoted clockwise and causes rollers 287 and 292 to tend to roll away from grippers 275 and 276. However, the action or bias of springs 286 and 291 maintains grippers 275 and 276 in engagement with the rollers so that, as the yoke is swung toward its unactuated position, the rollers allow the grippers to swing from their closed position toward their open position.

Referring now to the embodiment shown in FIGURES 17–19, 23 and 24, link 272 is connected by a pin 303 to an intermediate portion of a lever 304 pivotally mounted at one end on table 124 by pivot pin 305. The free end of lever 304 is pivotally connected by pivot pin 307 to a yoke 306. A pair of grippers 308 and 309 are pivoted on pin 310 mounted on the table at the apex of aperture 126, pins 303, 307 and 310 being substantially equidistant from pin 305.

As best seen in FIGURE 23, the free end of each gripper, 308, 309 has an L-shaped tip suitably attached thereto. Tip 312 is adapted to overhang that portion of table 124 adjacent to the arcuate portion 256 of the aperture 126 associated therewith and slides easily theren upon movement of the grippers to and from their open position. Preferably, tip 312 is slightly spaced from table 124 except when a pin is picked up by the grippers. However, the tip can be made of a bearing material, such as Nylon or Teflon, having self-lubricating properties to minimize friction, in which case the tip portion can slidably engage the upper surface of adjacent portions of table 124, as shown in FIGURE 23.

Grippers 308 and 309 are similar to grippers 275 and 276 and include an elongated straight portion and a curved base portion. But in this case, the grippers are dissimilar, since each of grippers 308 and 309 include a cam groove 313 forming an integral part thereof defined by a bottom wall 314 and a pair of vertical side walls 315 having overhanging lips 316. Yoke 306 carries a support member 311, the yoke and support member 311 pivotally supporting, via a pair of pins 318 and 320, a pair of rollers 317 and 321, respectively, which are received in cam grooves 313 of the grippers and positively cam the grippers in both directions. The diameters of the rollers are approximately equal to the width of bottom walls 314 and to the spacing between side walls 315. A microswitch 319 is carried by support member 311 and is actuated similar to switch 299. As in the case of the modification shown in FIGURE 21, screw 297 threadably supported in an extension in yoke 306, and encircled by spring 298 limits the movement of gripper 308 towards microswitch 299 and thereby prevents damage to this switch.

Thus, the principal difference between this embodiment and the first embodiment is that the rollers positively drive the grippers instead of relying on the bias of springs, similar to springs 286 and 291, for maintaining the rollers in engagement with the grippers for movement in at least one direction. Otherwise, the operation of the grippers is substantially identical and no further explanation is deemed necessary. That is, when a pin is picked up its weight causes grippers 308 to flex downwardly whereby the tips 312 thereof, if not already engaged with portion 256, engage or press against portion 256 and prevent grippers 308 from moving or being swung on their pivot pin 307 while in closed pin holding position or due to the arcuate swing of the table as it is raised and lowered. Note that lever 304 has an elongated hub 327 (FIGURE 19) which surrounds pin 305 and acts as a stop member that engages gripper 308 when the grippers are in the open position.

As shown in FIGURE 24, grippers 308 and 309 may have generally C-shaped cross sections, each including an oppositely tapered or inclined vertical portion 328 having a taper corresponding to that portion of the head of a pin which is above the neck of the pin, i.e., the portion having the last diameter. In the first embodiment, the vertical portions are not tapered or inclined so that a pin is supported by the upper edges of the vertical portions 278. However, grippers 275 and 276 may have any other suitable cross-section and taper as in the case of grippers 308 and 309.

In both embodiments, the grippers are actuated in a timed relationship to movement of table 124 so that the grippers reach their closed positions when they are at the same height as the neck of a bowling pin. With reference to FIGURE 24 and grippers 308 and 309, dotted lines A represent the relative position between a pin and grippers 209 and 308 when the grippers reach the closed positions. This movement of the grippers into the closed position is an aligning operation whereby the grippers are brought into alignment with a pin prior to application of a gripping force. Thus, although the grippers can then be moved laterally into engagement with the neck of the pin, in the illustrated embodiments the grippers are raised due to raising of the table so that the clearance is taken up. Thus, the relative position between grippers 308 and 309 (and 275 and 276) and a pin at the time of engagement is illustrated by dotted line B on FIGURE 24. This construction is advantageous because, when the table is lowered to respot the pins, the bases of the pins contact the alley prior to the time at which the table reaches its lowest position of travel and the grippers are opened under no-load conditions.

*Respotting units drive mechanism*

As best seen in FIGURES 4, 5 and 10–14, the respotting units drive mechanism comprises a link 331 which at one end is pivotally connected to rod 261 for driving the rod and at its other end is connected to one end of a bell crank 332 pivoted on a vertical pin 333 (FIGURE 14). Bell crank 332 has an upper portion 334 to which link 331 is connected and a lower portion 335 pivotally connected to link 336. Bell crank 332 also has a lug 337 connected to a spring 338 which acts as an overcenter spring and is operative to bias bell crank 332 in a counterclockwise direction when in the position shown in FIGURE 14 and in a clockwise direction when the respotting units have been actuated or moved to pin holding positions. An adjustable stop screw 339 is supported on table 124 is engageable with lower portion 335 of lever 332, as shown in FIGURE 14, to establish the rearmost position of rod 261.

Link 336 has its other end connected to the lower portion of a lever 341 pivotally mounted on a horizontal transverse shaft 342 supported by a bearing 343, which is integral with table 124, along a portion intermediate to the ends of the shaft. Attached to the other end of shaft 342 is a star latch 344 having an upper notch 345, a lower notch 346 and a separating point or nose 347 (FIGURE 5), the point 347 being operative to slidably engage the end of a pivoted activating finger 348 and guide it into full engagement with one or the other of notches 345 and 346 when in alignment therewith.

The start latch 344 is engageable with finger 348 which is supported pivotally by pin 350 on the upper end of lever 349 movably mounted on pin 219. Finger 348 has an upwardly extending ear 348A to the opposite sides of which are attached one end of two finger centering springs 351, the other ends of which are secured to the free end of pin 350. These springs serve to yieldingly maintain finger 348 in proper relation with point 347 of star latch 344 to function as described hereinafter. The lower end of lever 349 is pivotally connected to the one end of a rod 353 having its other end pivotally connected to the lower end of lever 354 pivoted at its upper end on pin 238.

When bell crank lever 332 engages stop screw 339, rod 261 occupies the position shown in FIGURE 14 and grippers 257 and 258 or 308 and 309 are wide open and star latch 344 is located that lower notch 346 is positioned for engagement by finger 348, as shown in FIGURES 4 and 5.

Lever 341 has an upper, arcuate arm 365 which extends rearwardly and carries an adjustable stop screw 366 that is engageable with a stop pad 367 on the table. When stop screw 366 engages pad 367, star latch 344 is so positioned that upper notch 345 is aligned with finger 348 and bell crank lever 332 is located in its clockwisemost position, as viewed in FIGURE 3, thus establishing the forward limiting position of rod 261.

The under surface of arm 365 is a cam which is engaged by roller 226, the arm being provided with an upwardly extending arcuate recess 368. This recess and roller 226 are operative to open the grippers during a strike cycle, in a manner more fully described hereinafter.

A roller 355 is mounted on an intermediate portion of lever 354 (FIGURES 10–12) and is engageable with a cam 356 carried by shaft 152. A spring 357 has one end connected to the lower end of lever 354 and its other end connected to bracket 254, spring 357 being effective to bias lever 354 so that roller 355 remains in engagement with cam 356. As shaft 152 rotates during the operation of motor 150, variations in the profile of cam 356 cause lever 354 to pivot and in so doing move rod 353 an amount proportional to the variation in the cam profile to effect the respotting operation.

*Operation*

As previously indicated, the spotting units and the respotting units are actuated in a timed relationship to movement of table 124 along its vertical, arcuate path. The location of various pivot centers and the profiles of cams 252 and 356 are proportional relative to the arcuate motion of the table so that various cycles can be performed in the following manner.

*Spotting cycle*

Prior to starting the spotting cycle, motor 150 and solenoids 166 and 246 are deenergized; table 124 is in the dwell position; cups C1–C10 are empty and are in their pin receiving positions; and rod 261 is in its rearmost position so that the grippers of the respotting units are open, except when a preceding strike has been made, and the respot grippers remain closed, as described more in detail hereinbelow.

At the start of the spotting cycle, which occurs when a ball arriving in the pit strikes backstop 2 and closes a switch (not shown) forming a part of the control circuit unit designated generally 4, a set of ten bowling pins is fed from storage 6 located thereabove into cups C1–C10 by means (not shown). A suitable means may be such as shown in copending application Ser. No. 195,923, filed May 18, 1962, and now Patent No. 3,210,078, by Harry C. Congelli, Gordon W. Hays, Harold A. Jones and Roy E. Blewitt, Jr., for Bowling Pin Storage and Delivery Mechanism. Then, motor 150 and solenoid 166 are energized. As shaft 152 rotates, table 124 is lowered and raised, in the manner previously described, causing table 124 to move from the dwell position to lower position 132 (FIGURE 2) and back to the dwell position.

Throughout the spotting cycle, solenoid 246 is deenergized so that latch hook 235 engages pin 234 and lever 230 pivots about pin 234 to actuate tie rod 228 and lever 217. As the table is lowered, cups C1–C10 are rotated from their approximately horizontal pin receiving positions to their approximately vertical positions shown in FIGURES 5 and 6, the bases of the pins having been swung down through apertures 126 so that as the pins arrive at their approximately vertical position their bases extend below the table. As the pins arrive at this position, the table has descended to a point so as to position the bases of the pins approximately ½ inch above the alley and in substantially vertical alignment with their spot positions on the alley.

Until this time, lever 217 acting upon arm 214 has merely caused shafts 181–184 to rotate the pins to the above noted vertical position. As the table continues to descend, further counterclockwise rotation of lever 217 as viewed in FIGURE 6, causes roller 216, now engaging the left end of slot 215, to move yoke 190 rearwardly. This rearward motion of the yoke causes cups C1–C10 to move the bases of the pins rearwardly relative to the table in an amount equal to the forward component of table arcuate motion, so as to cause the bases of the pins to remain in substantial vertical alignment with their spot positions on the alley.

Continued descent of the table now causes the bases of the pins to contact their playing spots on the alley with the forward edges of the pin bases being first to contact, as shown in FIGURE 6. By further movement of the table to its lowermost position the cups C1–C10 are moved downwardly relative to the pins so that the tip portions 208 of the cups are cleared of contact with the pins while the portion of the cups contacting the head of the pins remain in sliding contact due to the above described slight forward tilting of the pin.

As the table reaches its lowermost position and begins to ascend, increased counterclockwise motion of lever 217 causes further rearward motion of yoke 190, causing the tip portions 208 of the cups to rearwardly clear the profile of the spotted pins, simultaneously allowing the pins to settle back fully spotted on their spots by the accompanying gentle rearward motion of the head portion of the spotting cups.

Then, as table T ascends, cups C1–C10 are held in vertical positions until their bases can swing toward their pin receiving positions without hitting the spotted pins. Then, the rotation of lever 217, is reversed, which allows yoke 190 to move to its normal position relative to table T and then to rotate cups C1–C10 in eheir pin receiving positions, such rotation of cups C1–C10 being aided by springs 211 on shaft 184.

Concerning the action of the respot drive mechanism throughout the spotting cycle, it should be noted that there is no specific structure, such as a clutch or the like, which disengages the respot drive mechanism. However, the greater extent of arcuate movement of the table during the spotting cycle, as compared to its arcuate movement during the respotting cycle, and the change in timed relationship between the position of the table and the profile of cam 356 due to this greater movement, causes lever 349 to pivot counterclockwise during the initial descent of the table, an amount sufficiently great so that the subsequent clockwise rotation, due to roller 355 engaging that portion of cam 356 which, during the respotting cycle, causes movement of the grippers 275, 276, or 308, 309, is ineffective to rotate star latch 344 and thereby actuate the grippers. In order to reach spotting position 132 table 124 moves past respotting position 131 (see FIGURES 1 and 2). Due to the fact that, as described herein, roller 226 is located beneath arm 365 during the spotting operation (FIGURES 4, 5, 9, 10 and 11), lever 227 and roller 226 are so positioned that counterclockwise movement of star latch 344 is prevented. Therefore, the tendency for lever 354 to move clockwise, as viewed in FIGURES 10 and 11, under the influence of springs 357 to effect the rotation of lever 344 and cause nose 348 to turn star latch 344, which would result in the actuation of the respotting mechanism, also is prevented. In other words, the respot drive mechanism is constructed so that the greater arc of movement of the table during the spotting cycle precludes movement of the grippers and actuation of the respotting units.

*Respotting cycle*

Prior to the start of the respotting cycle, the parts are positioned as they are prior to the spotting cycle. At the start of the respotting cycle, motor 150 is energized to rotate shaft 152 through two revolutions. Solenoid 166 remains deenergized throughout the respotting cycle so that the table is twice lowered and raised, in the manner previously described, between the dwell positions and a position 131 (FIGURE 2) above alley A.

Solenoid 246 is energized simultaneously with the energization of motor 150 to disengage latch hook 235 from pin 234 and render the spotting mechanism inoperative. Thus, throughout this cycle, spring 253 biases tie rod 228 rearwardly so that roller 216 engages the bottom of slot 215 and holds cups C1–C10 in substantially horizontal positions. This disengagement of latch hook 235 from pin 234 permits an idling motion of lever 230 outwardly and away from latch hook 235.

If solenoid 246 is deenergized for some reason during the respotting cycle, latch hook 235 pivots until stop screw 243 abuts channel member 120. Then latch hook 235 is so positioned that the returning movement of pin 234 hits inclined portion 249 and cams latch hook 235, counterclockwise as viewed in FIGURE 11, until pin 234 moves into recess 248. Normally, however, it is contemplated that solenoid 246 will be energized until the respotting cycle is nearly completed and pin 234 can be engaged by the latch hook without employing the above camming action. Cam 356 is shaped so that, each time the table is lowered during the respotting cycle, cam 356 allows spring 357 to rotate lever 354 clockwise and thereby move tie rod 353 rearwardly to pivot lever 349 clockwise. Such movement causes finger 348 to engage an aligned notch of star latch 344.

At the start of the respotting cycle, spring 338 biases bell crank 332 into engagement with stop screw 339 so the star latch 344 is positioned with lower notch 346 in alignment with finger 348. When the table descends to pin gripping position 131 above alley A, finger 348 is moved into engagement with notch 346 of star latch 344, so that further rotation of lever 349 rotates star latch 344 counterclockwise to the position shown in FIGURE 9. This movement of star latch 344 rotates lever 341 counterclockwise, moves link 336 forwardly, rotates bell crank 332 clockwise, moves link 331 and rod 261 forwardly and thereby actuates the respotting units to close the grippers 275 and 276 or 308 and 309 in the manner previously described.

This action is timed so that, when the table reaches its pin gripping position 131, the grippers are at the same height as the necks of any standing pins and are in their closed positions relative to such pins. Then, when table 124 is raised, the standing pins are picked up allowing pin sweep 8 to clear the alley.

Spring 338 is positioned relative to pin 333 so that the line of spring force crosses over center thereof at the time the grippers of the respotting units reach their closed positions, thereby biasing bell crank lever 332 toward its clockwise position, biasing stop screw 326 into engagement with pad 367, and permitting spring 338 to be operative to hold the parts in this position until star latch 344 is subsequently actuated.

As the table is raised, finger 348 is returned to its normal inoperative position due to the movement of lever 349 and spring 351. When the table is lowered the second time, finger 348 engages the upper notch 345 and thereby rotates star latch 344 clockwise to the position opposite to that shown in FIGURE 9. This motion causes bell crank lever 332 to rotate counterclockwise to the position shown in FIGURE 14. Due to timed relationship, this motion occurs as the table reaches its lowest position. As previously indicated, when the pins are picked up by the grippers a clearance is taken up so that, as the table is lowered to respot such pins, the bases of the pins engage the alley prior to the table reaching its lowest position. Thus, the grippers are opened under no-load conditions since the pins are fully supported on the alley.

Spring 338 is now positioned relative to pin 333 so that the line of spring force crosses over center thereof, as shown in FIGURE 14, and now biases bell crank lever 332 towards its counterclockwise position into engagement with stop screw 339, permitting spring 338 to be effective in holding the parts in this position until star latch 344 is again actuated in later cycles.

Then, the raising of the table for the second time causes the parts to move into the positions which they normally occupy when the table is in the dwell position, thereby clearing the alley so that the next ball of the frame can be thrown.

*Strike cycle*

If the first ball of a frame accomplishes a strike, the spotting-respotting mechanism is operated through a strike cycle. Effectively, the strike cycle is the first half of a respotting cycle in conjunction with a spotting cycle. That is, after the first ball of a frame has been thrown, the mechanism is operated through at least the first half of the respotting cycle regardless of whether or not a strike has been made. If a strike has been made, none of the microswitches 299 or 315 associated with the respotting units will be actuated, so that an indication is provided that a strike has been made. Thereafter, when the table ascends into the dwell position, suitable control circuitry deenergizes motor 150 and solenoid 246 for a period of time sufficient to allow a new set of bowling pins to be fed into the pin spotting cups. Thereafter, the mechanism is operated through a spotting cycle which is identical to that previously described with one exception: Since the grippers of the respotting units are in their closed positions when they reach the dwell positions, the grippers have to be opened to allow passage of the pins which are to be spotted through the apertures.

Opening of the grippers is accomplished in the following manner. As previously indicated, the under surface of arm 365 is an arcuate cam provided with a recess 368 arranged to receive roller 226. During the spotting cycle, the center of the radius of curvature of the under surface of arm 365 is coincident with the axis of rotation of roller 226 so that the roller merely rides along the under surface in a dwell condition. When, however, during the respotting cycle, arm 365 has been moved to its counterclockwisemost position, as shown in FIGURE 9, roller 226 is located in recess 368. Since, during the normal respotting cycle, the lowering of the table for the second time does not pivot lever 217, arm 365 remains in this position until the star latch 344 is subsequently actuated. However, when, during the strike cycle, the table is lowered to perform the spotting portion of the strike cycle, the pivoting of lever 217 for the purpose of actuating the spotting cups, causes roller 226 in rolling out of recess 368 to cam up arm 365 and in so doing causes arm 365 to be swung clockwise to its upper limiting position and thereby open the grippers of the respotting units and thereby clear the path for the descending pins through aperture 126. This opening of the grippers positively and automatically occurs whenever the grippers are closed and the spotting cups are actuated and thereby form a mechanical safety interlock.

*Foul cycle*

If, during delivery of the first ball, a foul is detected, by means not shown, control circuitry (not shown) directs the spotting machine to sweep the alley clear of all bowling pins, whether standing or not, and to operate the spotting-respotting mechanism through a spot cycle. Then after delivery of the second ball, the mechanism is also operated through a spotting cycle.

*Fail-safe features*

If shaft 152 is rotated, either due to operation of motor 150 or by being manually cranked, so as to begin to lower table 124, and if both solenoids 166 and 246 are deenergized so that the hooks associated therewith engage pins 152 and 234 respectively, cams 252 and 356 are rotated in directions tending to cause simultaneously actuation of the respotting units and of the spotting units. As the table is lowered, tie rod 228 will rotate lever 217 an amount which, although less than that which occurs during the spotting cycle because of the reduced arc of table motion, is nevertheless sufficient to roll roller 226 out of notch 368 and along the under surface of arm 365 and thereby rotate arm 365 clockwise and prevent arm 365 from being subsequently rotated counterclockwise by action of finger 348. As the table is lowered and finger 348 is moved into engagement with star latch 344, the star latch is prevented from rotation due to the noted blocking of arm 365 by roller 226, so that the star latch arrests further motion of lever 349. Due to the arcuate motion of the table, further lowering of the table causes tie rod 353 to disengage roller 355 from cam 356, thus allowing shaft 152 and motor 150 to be safely run through.

If motor 150 is operated or manually cranked, and coincidentally, if hooks 171 and 235 are disengaged from pins 157 and 234, table 124 will descend toward its lowermost position. The respot drive mechanism will be ineffective, due to the increased arc of motion of the table, in the manner previously described. However, because pin 234 is not restrained as during the spotting cycle, the increased arc of table motion causes lever 230 to rotate and rock a greater amount than is normal. To prevent damage to any of the parts, an emergency adjustable stop screw 369 is mounted on channel member 121 and is engageable with lever 230 to limit movement thereof during such a malfunction. Thus, as the table is lowered and the movement of lever 230 is arrested by stop screw 369, tie rod 228 rotates lever 217 counterclockwise an amount sufficient to prevent tie rod 228 from interfering with and being damaged by that portion of the table which forms the pivotal mounting for shaft 342. This action thus permits motor 150 to safely complete its run through and thereby elevate table 124 to the dwell position. In the event spotting cups C1–C10 support any bowling pins prior to such a malfunction, the resulting partial spotting action prevents such pins from being deposited on the alley so that such pins are carried upwardly as the motor is run through.

As table T comes down, pin 157 in slot 161 engages roller 176 thereby actuating switch 175. This actuation causes sweep 8 to stop in its forward down position, table T runs through its path of travel to and from the alley A thereby causing pin 157 to move farther to the right in slot 161, as viewed in FIGURE 7, after which the pin 157 moves in the reverse direction in slot 161 or to the left, as viewed in FIGURE 7 whereby the table is then raised to its dwell position. It will be noted that pin 157 in operating switch 175 incapacitates the sweep drive motor 177 which causes the sweep to remain in its "down" position and then to reverse so that the sweep will not run through and remove any pins from the lane. Thus, any pins which have been knocked down by the ball must be removed manually. If there is no dead wood the bowler may throw his second ball.

If desired, instead of controlling the operation of sweep motor 177, the operation of switch 175 may cause the lighting of a signal lamp or actuate an audible signal which informs a bowler that there is a pin too far offspot to be held and lifted by the respotting grippers. In this case, table drive motor 150 will be incapacitated so that the further motion of the table downwardly will be prevented until the too far off-spot standing pin has been removed, and then replaced, after which the table is moved by motor 150 up to its dwell position above alley A.

Referring to FIGURES 1*a* and 3, it will be seen that there is provided a safety feature which prevents downward movement of table T towards standing pins on alley A if for any reason grippers 275 and 276 or 308 and 309 have been moved to their closed positions as shown in FIGURES 3 and 8 from their fully open positions shown in FIGURES 1*a*, 14 and 15. Gripper actuating rod 264 is provided with a bracket having an actuating arm 376 adapted to engage and operate switch 374 suitably mounted on table 125 when rod 264 is moved to its extreme operating position or to the left, as viewed in FIGURE 3, to fully open grippers 275 and 276 or 308 and 309, arm 376 will engage switch 374. When this occurs there is no reason why the table T should not move downwardly to its pin presence detecting position, because the several sets of grippers are open. However, in the event that rod 264, or any of the associated rods 261, 262 and 263 do not move properly into their positions where the grippers are fully opened, then switch 374 is not actuated and hence the control circuit through the table operating motor will not be closed and table operating member 150 will not be actuated to effect the raising and lowering of table T in the manner described hereinabove.

The control mechanism for effecting the controlled operation of the mechanism disclosed and described herein may be similar to that disclosed in copending application Ser. No. 195,927, filed May 18, 1962, and now Patent No. 3,231,272, by Roy E. Blewitt, for Control Mechanism For Bowling Pin Spotting Machine. Since the control mechanism forms no specific part of the present invention, further showing thereof is considered to be unnecessary and is omitted.

It will be obvious to those skilled in the art that many changes can be made both in the details of construction and arrangement of parts without departing from the scope of the invention as defined in the appended claims.

What is claimed is:

1. In a bowling pin respotting mechanism, the combination of: a table having a plurality of apertures arranged in a triangular formation relative to the pin positions on a bowling lane, said table being adapted to be mounted above an alley for movement relative thereto between a dwell position and a lower position; means for moving said table between said positions through a respotting cycle; a plurality of respotting units carried by said table, each of said respotting units being associated with a different one of said apertures and comprising: a pair of elongated grippers, means pivotally mounting each pair of grippers at one end on said table at a point displaced laterally of its respective pin position for movement across the associated aperture between an open position and a closed position; and actuating means for moving said grippers between said positions, said respotting units being constructed so that the tops of the heads of standing pins are free from engagement with said respotting mechanism at all times; and means for operating said respotting units in a timed relationship to movement of said table.

2. The mechanism defined in claim 1, further including:

means responsive to the closing of the grippers at said lower position for detecting when the first ball of a frame has accomplished a strike, and means responsive to the detection of a strike for returning the grippers to their open position during the next movement of the support member to said lower position.

3. In a bowling pin respotting mechanism, the combination of: a support member adapted to be mounted above an alley for movement relative thereto between a plurality of vertically spaced positions; a plurality of respotting units carried by said support member, each of said units comprising: a pair of movable grippers, actuating means for moving said grippers in a substantially horizontal plane between open and closed positions; said actuating means being operable to move only one of said grippers into engagement with a standing pin during the movement of said grippers from said open position to said closed position, said one gripper engaging the standing pin with a force insufficient to tilt such pin and the other gripper being movable into engagement with said pin in response to the movement of said support member to an upper vertically spaced position, said actuating means being operable to move said grippers between said positions prior to the upward movement of said support member; and means for cyclically operating said support member and said respotting units in a timed relationship through a respotting cycle.

4. In a bowling pin respotting mechanism, a combination according to claim 3, further including:

linkage means operably connected to each of said actuating means for simultaneously actuating all of said respotting units such that the grippers are simultaneously moved into their closed positions, and said respotting units being constructed so that when the pins are picked up by thereby, said gripper bars remain in said closed position without imparting to said linkage means any forces due to the weight of the picked up pins.

5. In a bowling pin respotting mechanism for use with a bowling alley, the combination of: a table having a plurality of apertures arranged in a triangular formation conforming with the pin spot positions on the pin deck of a bowling alley, each of said apertures being sector-shaped and bounded by: an arcuate portion; an apex; and a pair of divergent side portions extending between said apex and the ends of said arcuate portion; a plurality of respotting units carried by said table, each of said units comprising: a pair of elongated grippers, a vertical pin pivotal mount for one end of said grippers located at said apex and laterally relative to its respective pin spot position for movement of said grippers about a vertical axis in a substantially horizontal plane along an arc subtended by a chord extending substantially longitudinally of said alley between an open position and a closed position, each of said grippers including a curved base portion and a straight portion which lies adjacent to one of said side portions when such gripper is open and which overhang said arcuate position upon movement of such gripper from its open position; the straight portions of said grippers being parallel, when closed, and spaced a distance less than the maximum diameter of the head of a pin but greater than the diameter of the neck of a pin, cam means engaged with said base portions so that said grippers are moved as a result of movement of said cam means; and a yoke supporting said cam means, said yoke being pivotal about a vertical pin which is movable in a horizontal plane; and means for moving said yoke and said table in a timed relationship through a respotting cycle.

6. A bowling pin respotting mechanism in accordance with claim 5 wherein said last named means comprises a table drive mechanism and a respotting unit drive mechanism.

7. A bowling pin respotting mechanism in accordance with claim 6 wherein said respotting units drive mechanism includes: a star latch movable alternately between a pair of positions, means connecting said star latch and grippers such that said grippers are closed when said star latch is in one of said positions and said grippers are open when said star latch is in the other of said positions; and a finger pivot pin normally disengaged from said star latch but movable into engagement therewith for shifting said star latch between said positions for actuating said respotting units.

8. A bowling pin respotting mechanism in accordance with claim 7 wherein: said table is movable between a dwell position and a first lower position during said respotting cycle, said table being further movable between said dwell position and a second position lower than said first position at times other than during said respotting cycle; and selectively operated means for moving said finger pivot pin into engagement with said star latch.

9. Respotting mechanism for use with a pin spotting machine for respotting bowling pins on the playing bed of a bowling alley comprising a plurality of respotting units, each of said units including a pair of pivotally mounted gripper bars movable in a substantially horizontal plane between an open and a closed position, each of said bars including an elongated straight portion, which when said gripper bars are closed lies substantially parallel to the straight portion of the other gripper bar, and is spaced therefrom a distance greater than the minimum diameter of a bowling pin but less than the maximum diameter of the head of a bowling pin, actuating means for moving said bars between said positions, and means for moving said units upwardly when said bars are in closed position to cause said bars to come into engagement with standing pins to hold and lift said standing pins for respotting, said means for moving said units upwardly being free of means for clamping standing pins against the playing bed of the bowling alley.

10. The mechanism defined in claim 9, wherein said actuating means for said gripper bars comprises a yoke, means mounting said yoke to move in a plane substantially parallel with the plane of movement of said bars, means carried by said yoke for engaging said bars and moving them to closed positions, and means for operating said yoke to effect the desired movement of said bars.

11. The mechanism defined in claim 9, wherein each of said bars is provided with a curved portion, and the ends of said curved portions are joined to a common pivot, an actuating yoke, a cam follower carried on each end of said yoke, and means for moving said yoke to engage said cam followers with said curved portions of said bars to effect their movement to closed position.

12. The invention defined in claim 11 including means coacting with said operating means to maintain said bars in closed position to hold pins located therebetween, and other means for restoring said bars to open position to release respotted pins held thereby.

13. The mechanism defined in claim 9, wherein each of said gripper bars comprises a cam portion, and wherein said actuating means comprises a yoke, cam followers carried by said yoke and engaging said cam portions, and means for moving said yoke to travel said cam followers in a substantially horizontal path of travel along said cam portions in effecting the movement of said gripper bars into closed pin holding position, and into open position.

14. In a bowling pin respotting mechanism, the combination of:

a support member, a plurality of respotting units carried by said support member, each of said units comprising:

a pair of gripper bars, each including a straight portion and spacing means, and actuating means for moving said gripper bars between open and closed positions;

means for cyclically moving said support member relative to the alley pin deck through a respotting cycle between upper and lower positions, and means for operating said actuating means in timed relationship with said support member moving means such that the gripper bars are moved into their closed position when the support member is in its lower position, said spacing means being operable, when the gripper bars are in their closed position, to space one of the gripper bars of each pair from the neck of a pin after the other gripper bar engages the neck of the pin, the straight portions of the grippers then lying substantially parallel to each other, the gripper bars then being operable, in response to upward movement of the support member, which movement causes said one gripper bar of each pair being brought into engagement with the heads of said pins, to pick up standing bowling pins for respotting.

15. In a bowling pin respotting mechanism the combination of:

a support member free of means for clamping standing pins against the alley pin deck, a plurality of respotting units carried by said support member, each of said units comprising:

a pair of movable gripper bars, and actuating means for moving said gripper bars between open and closed positions;

means for cyclically moving said support member relative to the alley pin deck through a respotting cycle between upper and lower positions, and means for operating said actuating means in timed relationship with said support member moving means such that the gripper bars are moved into their closed position when the support member is in its lower position and subsequent upward movement of said support member brings the gripper bars into engagement with free standing bowling pins, whereupon further upward movement of said support member is operable to cause the gripper bars to pick up said pins for respotting.

16. In a bowling pin respotting mechanism for use with a bowling alley having a pin deck provided with pin positions, the combination of:

a support member, a plurality of respotting units carried by the support member, each respotting unit being spaced from a pin position and comprising:

a pair of grippers, each mounted at one end thereof on the support member at a position thereon laterally spaced, with respect to the bowling alley, from its corresponding pin position, the other ends of said grippers being normally free of engagement with said support member, and actuating means for moving the grippers toward and away from each other between open and closed positions, the grippers being spaced apart, in their closed position, a distance greater than the minimum neck diameter of a pin;

means for cyclically moving the support member between upper and lower positions in a respotting cycle, each of said grippers when in its lower position being disposed at a height above the alley equal to the height above the alley of the minimum neck diameter of a standing pin, means for operating the actuating means in timed relationship with the support member moving means such that the grippers are operable, when in their closed position, to pick up a pin standing on the pin deck, the weight of the picked up pin being operable to cause said other ends of said grippers to frictionally engage portions of said support member to prevent lateral movement of the pin during the ascent and descent of said support member.

References Cited by the Examiner

UNITED STATES PATENTS

| | | | |
|---|---|---|---|
| 2,530,385 | 11/1950 | Frye | 273—43 |
| 2,705,145 | 3/1955 | Fluke et al. | 273—42 |
| 2,723,123 | 11/1955 | Hedenskoog et al. | 273—43 |
| 2,755,089 | 7/1956 | Zuercher | 273—42 |
| 2,757,000 | 7/1956 | Dowd et al. | 273—43 |
| 2,781,195 | 2/1957 | Holloway et al. | 273—43 |
| 2,788,212 | 4/1957 | Montooth | 273—42 |
| 2,817,528 | 12/1957 | Sanford | 273—42 |
| 2,977,121 | 3/1961 | Flint et al. | 273—43 |
| 3,048,398 | 8/1962 | Kalbfleisch | 273—43 |
| 3,072,405 | 1/1963 | Bauerschmidt | 273—43 |

RICHARD C. PINKHAM, *Primary Examiner.*

ANTON O. OECHSLE, *Examiner.*